United States Patent
Fagan et al.

(10) Patent No.: US 11,472,558 B2
(45) Date of Patent: Oct. 18, 2022

(54) AIRCRAFT SEAT

(71) Applicant: Textron Innovations, Inc., Wichita, KS (US)

(72) Inventors: Stephen Howard Fagan, Wichita, KS (US); Paul Stokholm Warren, Wichita, KS (US); Emily O'Kelley Pearson, Wichita, KS (US); Jeremy Joseph Kneuper, Hesston, KS (US); Phillip Kendrick, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 226 days.

(21) Appl. No.: 16/660,192

(22) Filed: Oct. 22, 2019

(65) Prior Publication Data
US 2020/0148366 A1 May 14, 2020

Related U.S. Application Data

(60) Provisional application No. 62/886,467, filed on Aug. 14, 2019, provisional application No. 62/760,393, filed on Nov. 13, 2018.

(51) Int. Cl.
*B64D 11/06* (2006.01)

(52) U.S. Cl.
CPC ...... *B64D 11/06395* (2014.12); *B64D 11/064* (2014.12); *B64D 11/0619* (2014.12)

(58) Field of Classification Search
CPC .......... B64D 11/06395; B64D 11/0619; B64D 11/064; B60N 2/501; A47C 1/12; G09B 9/10; G09B 9/14
See application file for complete search history.

(56) References Cited

U.S. PATENT DOCUMENTS

| | | | | |
|---|---|---|---|---|
| 2,629,425 | A | * 2/1953 | James | B64D 11/0641 297/317 |
| 5,294,085 | A | 3/1994 | Lloyd et al. | |
| 5,299,853 | A | 4/1994 | Griswold et al. | |
| 5,829,982 | A | * 11/1998 | Advani | G09B 9/14 434/58 |
| 5,947,740 | A | * 9/1999 | Kim | G09B 9/04 434/29 |

(Continued)

FOREIGN PATENT DOCUMENTS

GB 2478408 A * 9/2011 ............... G01V 7/16

*Primary Examiner* — Richard R. Green
*Assistant Examiner* — Madison Elizabeth Dittner
(74) *Attorney, Agent, or Firm* — Avek IP, LLC

(57) ABSTRACT

A seat base includes a plurality of linear actuators each having a first end pivotally mounted to a base member and a second end pivotally mounted to a seat member. A controller is adapted for controlling an extension length of each of the plurality of linear actuators in a coordinated manner for adjusting a position of the seat member with six degrees-of-freedom and for damping vibration of the seat member. An active vibration mitigation method for reducing vibrations of an aircraft seat includes receiving vibration data from one or more accelerometers mounted to the aircraft seat and determining a vibration profile based on the vibration data. When vibration mitigation is warranted, control signals for damping vibration are determined and transmitted to a plurality of linear actuators adapted to support the aircraft seat.

17 Claims, 12 Drawing Sheets

(56) References Cited

U.S. PATENT DOCUMENTS

| | | | |
|---|---|---|---|
| 6,059,253 A * | 5/2000 | Koutsky | B60N 2/501 248/550 |
| 6,340,152 B1 | 1/2002 | Ritchie et al. | |
| 7,134,721 B2 * | 11/2006 | Robinson | B60N 2/501 297/284.3 |
| 7,878,312 B2 | 2/2011 | Hiemenz et al. | |
| 8,138,888 B2 * | 3/2012 | Mukherjee | B64D 11/06395 340/5.82 |
| 8,578,811 B2 * | 11/2013 | Alet | G09B 9/12 74/490.09 |
| 9,422,058 B2 | 8/2016 | Fischer et al. | |
| 9,841,884 B2 | 12/2017 | Nagara et al. | |
| 9,842,509 B2 * | 12/2017 | Van Lookeren Campagne | G09B 9/12 |
| 10,052,976 B2 * | 8/2018 | Atger | B60N 2/2222 |
| 10,220,949 B2 * | 3/2019 | Thomaschewski | B64D 11/064 |
| 10,259,343 B2 | 4/2019 | Cengil et al. | |
| 10,423,271 B2 | 9/2019 | Fan et al. | |
| 10,713,971 B2 * | 7/2020 | Schlusselberger, Jr. | G06T 19/006 |
| 10,849,431 B2 * | 12/2020 | Cheng | H02J 7/025 |
| 10,970,998 B1 | 4/2021 | Lange et al. | |
| 11,161,430 B2 | 11/2021 | Karlsson et al. | |
| 2006/0237885 A1 | 10/2006 | Paillard et al. | |
| 2016/0080042 A1 | 3/2016 | Thoreux | |
| 2018/0199729 A1 | 7/2018 | Bullard et al. | |
| 2020/0320897 A1 * | 10/2020 | Veltena | G09B 9/02 |

* cited by examiner

AIRCRAFT SEAT

CROSS-REFERENCE TO RELATED APPLICATIONS

This application claims the benefit of U.S. Provisional Application No. 62/760,393 entitled "Hexapod Seat Base" and filed on Nov. 13, 2018, and U.S. Provisional Application No. 62/886,467 entitled "Aircraft Fluid Thermal Control System" and filed on Aug. 14, 2019, which are herein incorporated by reference in their entireties.

BACKGROUND

1. Field

Embodiments of this disclosure relate generally to the field of adjustable seats, and more specifically to a fully electric and controllable seat for use onboard aircraft.

2. Description of the Related Art

U.S. Patent Application Publication No. 2018/0199729 to Bullard et al. discloses an automatically adjusting comfort system that may be used in an aircraft seat to provide comfortable seating for extended periods of time.

SUMMARY

In an embodiment, a seat base includes a plurality of linear actuators, each one of the plurality of linear actuators having a first end pivotally mounted to a base member and a second end, opposite the first end, pivotally mounted to a seat member. A controller is adapted for controlling an extension length of each of the plurality of linear actuators for adjusting a position of the seat member and for damping vibration of the seat member.

In another embodiment, an active vibration mitigation method for reducing vibrations of an aircraft seat includes receiving vibration data from one or more accelerometers mounted to the aircraft seat, determining a vibration profile of the aircraft seat based on the vibration data, and determining whether vibration mitigation is warranted. When vibration mitigation is warranted, the method includes determining control signals for damping vibration and transmitting the control signals to a plurality of linear actuators adapted to support the aircraft seat.

In yet another embodiment, a seat base includes a plurality of linear actuators each pivotally mounted by a first end to a base member and by a second end, opposite the first end, to a seat member to enable movement of the seat member. A controller controls extension of the plurality of linear actuators in a coordinated fashion for controlling movement of the seat member.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

Figure 1:
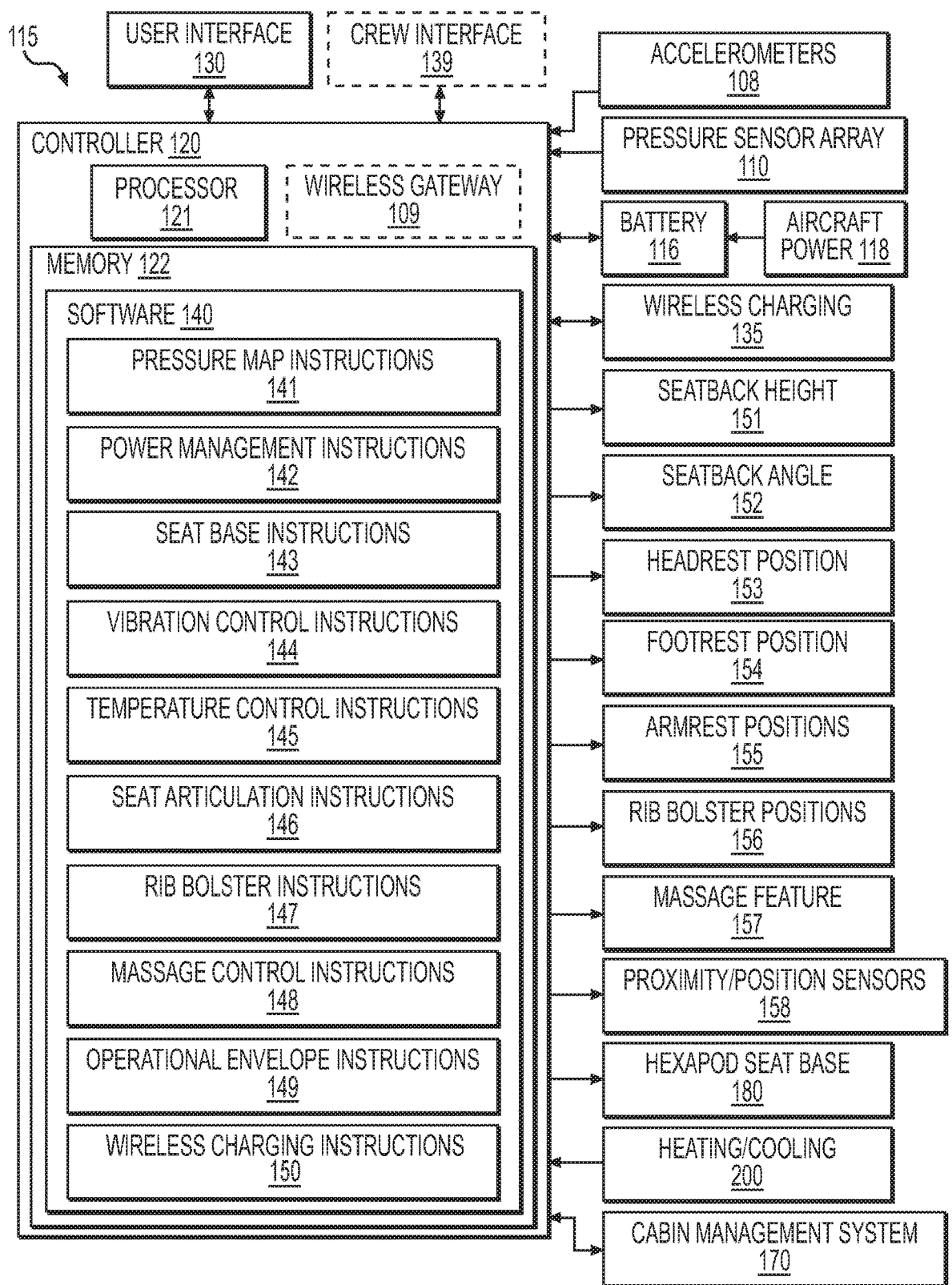
FIG. 1 is a block diagram of a control architecture used for the control of an aircraft seat, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

Seats onboard aircraft typically lack height adjustability for accommodating occupants of different heights. Additionally, aircraft seats do not provide any active means to counteract vibrations experienced onboard aircraft. Embodiments of the present disclosure include a fully electric seat that provides seat position adjustability and active vibration damping.

A fully electric seat consumes relatively large amounts of electrical current. When multiple users adjust their seats simultaneously, this can have adverse effects on an aircraft's electrical system. Embodiments of the present disclosure include a battery system and electrical subsystem for providing electrical power to one or more seats. A dedicated battery system enables multiple seats to be adjusted simultaneously without adversely affecting the aircraft electrical system. By locating the battery system away from the seats, each seat weighs less making it easier to install, maintain, and remove.

In situations where electrical power becomes unavailable from the aircraft's electrical system, a fully electric seat must have an alternate means to return the seat to a taxi, takeoff, and landing (TTOL) position that does not require electrical power. This may be accomplished by removing the seat cushions and pulling physical cables that release the seat actuator, which allows the user to manually position the seat in the TTOL position. However, by providing a dedicated battery system for the electric seats, the seats may be programmed to automatically move to the TTOL position during the appropriate phase of flight using the dedicated battery power.

User interfaces for adjusting seating position typically include a plurality of pushbuttons and/or lever pulls. Embodiments of the present disclosure include a user interface built into the seat armrest with a compact and intuitive form factor that enables a user to manipulate movement of the seat, as well as access to seat temperature control and cabin management systems, among other things.

Thermal control of aircraft seating typically includes the use of heating pads and/or thermal electric generators (TEG), which require large amounts of electrical current that is taxing on the electrical system of an aircraft, as well as fans for cooling, which generate unwanted noise. Embodiments of the present disclosure include a thermal control system that circulates a fluid to provide heat transfer for heating and cooling.

Electric Seat Controller

FIG. 1 is a block diagram of a control architecture 115 used for the control of an aircraft seat 100 (depicted in FIG. 12), which includes a controller 120. In general, controller 120 actively monitors subsystems of seat 100, determines actions to be performed, and then sends commands to the appropriate subsystems. For example, controller 120 receives signals (e.g., from the aircraft, a pilot interface, a user interface, or other seat subsystems), performs calculations and computations based at least partially on the received signals, sends commands to seat subsystems, and manages and regulates all functions necessary for operation of seat 100. Additionally, controller 120 manages signal input/output (I/O) as well as power and communication links for controlling functionality of seat 100. In certain embodiments, controller 120 is a local controller dedicated to a particular seat 100 such that an aircraft having a plurality of seats 100 also have a respective plurality of local controllers 120. In some embodiments, controller 120 is located within seat 100 such that when a seat 100 is installed on an aircraft, seat 100 includes a built-in controller 120.

Controller 120 is for example a computer, microcontroller, microprocessor, or programmable logic controller (PLC) having a memory 122, including a non-transitory medium for storing software 140, and a processor 121 for executing instructions of software 140. Memory 122 may be used to store information and instructions of software 140, such as instructions 141-149 listed in FIG. 1 and described below. The software instructions may include but are not limited to algorithms, lookup tables, and computational models. For example, controller 120 may store instructions in memory 122 for customizing seat configurations to accommodate personal preferences of individual users, which may then be reused on subsequent flights. Controller 120 may be embodied in one or more printed circuit boards (PCBs) and/or integrated circuits (ICs). Controller 120 is not limited by the materials from which it is formed or the processing mechanisms employed therein and, as such, may be implemented via semiconductor(s) and/or transistors (e.g., electronic integrated circuits (ICs)), etc.

Controller 120 further includes a user interface 130 for a user to receive information and input instructions for adjusting seat 100. In certain embodiments, interface 130 is built into the seat armrest with a compact and intuitive form factor that enables a user to manipulate movement of the seat, as well as access to seat temperature control and cabin management systems. Interface 130 is further described below in connection with FIGS. 3-5. The user may be an occupant of seat 100 (e.g., a passenger or crew member), maintenance personnel, or other aircraft operator/manager. In some embodiments, a crew interface 139 is optionally provided for enabling a crew member (e.g., a pilot or attendant) to control functions of seat 100, as further described below in connection with FIGS. 7 and 11.

Communication between controller 120 and subsystems of seat 100, which are described below, may be by one of a wired and/or wireless communication media. For example, controller 120 includes input/output (I/O) ports for communicating with various subsystems of seat 100. Industry standard safety protocols are used to ensure that all wireless signals avoid having radio frequency (RF) energy couple onto aircraft system critical lines. A wireless gateway 109 may optionally be employed for facilitating wireless communication as further described below.

Controller 120 is adapted to manage all communication between the subsystems, including features which are both internal and external to controller 120. Communication with external subsystems may be one-way or bidirectional. For example, the cabin management system (CMS) 170 communicates bidirectionally with controller 120 (e.g., CMS 170 transmits data to controller 120 and controller 120 transmits data to CMS 170), whereas accelerometers 108 transmit data to controller 120 but typically do not receive data from controller 120. Massage feature 157 receives data commands from controller 120 but typically does not transmit data to controller 120.

Internal communications occur between various features performed by controller 120. For example, pressure map instructions 141 process data received from pressure sensor array 110 to determine whether a user is experiencing an uncomfortable position. As a result, controller 120 may transmit command signals to massage feature 157 for activation. In certain embodiments, massage feature 157 may be activated by a user via user interface 130 independent of pressure mapping information.

In situations when main ship-side power of the aircraft is unavailable, components of seat 100 operate off of battery power from a battery 116. Electrical power requirements of seat 100 are managed by controller 120, which includes electrical usage of battery 116. Specifically, controller 120 uses power management instructions 142 to manage load sharing/shedding features for preventing damage to any subsystems. For example, if the heating system is active when a user commands seat 100 to transition into a bed configuration, controller 120 may temporarily halt heating while any actuators/motors are active. Once the transition to a bed configuration is complete, controller 120 redirects electrical power back to the heating system. By employing intelligent power management, the life of battery 116 may be increased by reducing usage of the battery cells.

A hexapod seat base 180 uses linear actuators 181-186 to provide movement for seat 100 as further described below in connection with FIGS. 6-10. Controller 120 provides commands to each of the actuators 181-186 via seat base instructions 143. Controller 120 may also provide active commands to actuators 181-186 via vibration-control instructions 144 for providing active vibration damping based on information received from accelerometers 108.

Portions of seat 100 may be heated or cooled via heating/cooling system 200. Controller 120, using temperature control instructions 145, processes heating and cooling requests from a user (e.g., via user interface 130). In response to the requests, controller 120 turns on various components of the heating/cooling system 200, as further described below in connection with FIGS. 11 and 12. Controller 120 also monitors predetermined threshold temperatures to prevent system and component damage as well as occupant injury.

Portions of seat 100 may be moved via position motors under control of controller 120. Exemplary portions of seat 100 that may be electrically deployed via position motors include a footrest, a headrest, armrests, the height of the seatback and an angle of the seatback (e.g., for reclining). Controller 120 processes deployment and retraction requests (e.g., received from user interface 130) and monitors a dynamic operational envelope to ensure the requests do not present interferences based on data received from a network of proximity and position sensors 158, which are further described below. Using seat articulation instructions 146, controller 120 send commands to position motors disposed within seat 100 for adjusting various features of the seat. These include a seatback height 151, a seatback angle 152, a headrest position 153, a footrest position 154, armrest positions 155, and rib bolster positions 156. In certain embodiments, headrest 153 includes audio features such as noise cancellation and/or personal audio speakers under control of controller 120.

In certain embodiments, seat 100 includes a plurality of rib bolsters integrated within the seatback. The rib bolsters are arranged laterally across the seatback and provide back support to a seated user at different height positions across the seatback. The rib bolsters may be adjustable along the height of, and within, the seatback for improving comfort of the seat according to personal preferences of individual users. In certain embodiments, each rib bolster is provided in an adjustable section of the seatback where the adjustable sections are moveable via position motors. The adjustable sections may be adjusted vertically, to add height to the seatback, as well as horizontally to provide spinal support. Controller 120 uses rib bolster instructions 147 to receive user inputs (e.g., via a user interface 130) and to provide command signals to motors of the adjustable sections of the seatback for adjusting positions of the rib bolsters. Each adjustable section of the seatback may include a left and a right rib bolster. In some embodiments, the rib bolsters are adapted with mechanical features that provide bending of the bolsters. Various adjustments to the position and shape of each rib bolster enable customization of the shape of the seatback. Each adjustable section of the seatback may further include air bladders for massage feature 157 and hydronic tubing for a heating and cooling subsystem 200, as further described below.

Massage feature 157 includes a pneumatics subsystem, which includes a plurality of air bladders in the seatback and the seat bottom adapted to provide massage to the user. The pneumatics subsystem includes a pneumatic pump, valves, and tubing fluidly coupled with the plurality of air bladders for increasing and decreasing pressure in the air bladders. Controller 120, using massage control instructions 148, determines a static or dynamic amount of pressure for each of the air bladders, which may be independently controlled via the valves. Options for which bladders to control may be based on inputs received from the user (e.g., via user interface 130) or via an automatically adjusting comfort system, such as that described in U.S. Patent Application Publication No. 2018/0199729 to Bullard et al., which is herein incorporated by reference in its entirety.

Seat 100 includes a network of proximity and position sensors 158, which includes a plurality of sensors used to determine a position of seat 100 and to determine proximity of seat 100 to nearby components of the aircraft. Controller 120, using operational envelope instructions 149, continuously determines and maintains a safe positional envelope for movement of seat 100. Each sensor of the plurality of sensors 158 is for example a wireless diffused photoelectric sensor capable of functioning as a non-contact proximity sensor. Signals from the plurality of sensors 158 are received by controller 120 and processed to determine locations of obstructions, both fixed and dynamic, and to determine that any seat movement commanded by the user will not result in a collision between the seat and another object, the user, or another passenger.

Controller 120 receives and processes inputs from a user via user interface 130. User interface 130 enables the user to command movements and features of seat 100. In certain embodiments, user interface 130 includes an analog input via a joystick (e.g., the entire user interface 130 is moveable to function like a joystick) as well as a digital input via a touchscreen 133. User interface 130 is integrated into seat 100 as further described below in connection with FIGS. 3-5.

In certain embodiments, a pressure-sensor array 110 is built into cushioning of seat 100 for actively and continuously measuring pressures applied to the seat by a seated user. Controller 120 is adapted to determine a cumulative pressure profile over time, and when a pressure is too great or too prolonged, adjustable features of the seat (e.g., seatback angle 152, headrest position 153, footrest position 154, armrest positions 155, rib bolster positions 156, massage feature 157, and/or heating/cooling subsystem 200) are used to alter the pressure profile for increasing the user's comfort. U.S. Patent Application Publication No. 2018/0199729 to Bullard et al., the entire disclosure of which is incorporated by reference, discloses an automatically adjusting comfort system that may be used in seat 100 under control of controller 120 to provide comfortable seating for extended periods of time.

In certain embodiments, a wireless charging feature 135 is provided with seat 100. Wireless charging feature 135 provides the user with the ability to recharge their personal electronic device without having to tether the device to an outlet. Controller 120, using wireless charging instructions 150, determines when a device is placed in the appropriate location for charging (e.g., when the device is in close proximity or touching wireless charging feature 135) and commands the recharging circuit to activate. Controller 120 provides "smart monitoring" of the wireless charging to reduce unnecessary power consumption and aid in intelligent load shedding (e.g., reducing simultaneous electrical power consumption among multiple subsystems of seat 100).

Wireless connectivity provides bidirectional wireless communication between controller 120 and subsystems of seat 100, as well as other aircraft systems. In certain embodiments, a wireless gateway 109 provides digital I/O connection between the seat, the aircraft and user. Wireless gateway 109 may be a router or integrated access device (IAD) that contains a plurality of I/O interfaces in order to wirelessly connect with controller 120 and subsystems of seat 100. Wireless gateway 109 reduces physical connections between the electric seat and the aircraft and may be adapted to provide a higher data throughput. The wireless communication may include, but is not limited to, WiFi, Bluetooth, ad-hoc mesh networking, and/or LiFi. With wireless connectivity, features of seat 100 may be controlled by the user via a personal electronic device that is communicatively coupled with wireless gateway 109. In some embodiments, wireless gateway 109 may include a web service application programing interface (API) client for handling Internet communication such that the user may control features of seat 100 via a personal electronic device while not onboard the aircraft. For example, the user may activate the heating/cooling system 200 to precondition (e.g., preheat or precool) their seat while travelling to the airport.

The cabin management system (CMS) 170 provides control of features on the seat to the flight crew. CMS 170 provides ship-side information to controller 120 for processing and management, which may include, but is not limited to, TTOL configuration, thermal control of the seat, automatic bed configuration, lockout feature (e.g., for infant/child protection), and a wake-up feature that uses a subtle vibration from hexapod seat base 180 to gently wake the occupant. Controller 120 provides feedback to CMS 170 for features not local to the seat, such as lighting, attendant call, cabin temperature control, audio and video selection, etc.

Controller 120 manages power requirements for safe operation of seat 100 including the charging circuit for the battery packs, described below in connection with FIG. 2. Controller 120 performs power management, intelligent load shedding and standby operation for seat 100.

In certain embodiments, the flight crew has the ability to configure a plurality of seats 100 into the TTOL position with the touch of a single button. In the event of an emergency, the flight crew instructs the seats to articulate to the TTOL position via a switch/button located in the cockpit to ensure passengers are ready for any emergency maneuvers. The signal from the cockpit is received by controller 120, which then commands the movement to take place. Battery system 116 provides electrical power for movement of each seat individually. The flight crew may also send instructions (e.g., via crew interface 139) to a plurality of seats for configuring the aircraft for multiple passengers. For example, passengers may move their seats while deboarding to assist with egress, and the flight crew may return the seats to the TTOL configuration in preparation for a subsequent flight. Crew interface 139 may include a switch/button in the cockpit for pilots and/or in the galley for flight attendant use, or a personal electronic device may provide a user interface for communicating with controller 120 to configure one or more seats 100. Seats 100 may be moved without the aircraft being connected to an auxiliary power cart, or without having an auxiliary power unit (APU) running, or without having a main engine running because the battery system 116 provides sufficient electrical current to move each seat.

Seat Battery System

Figure 2:
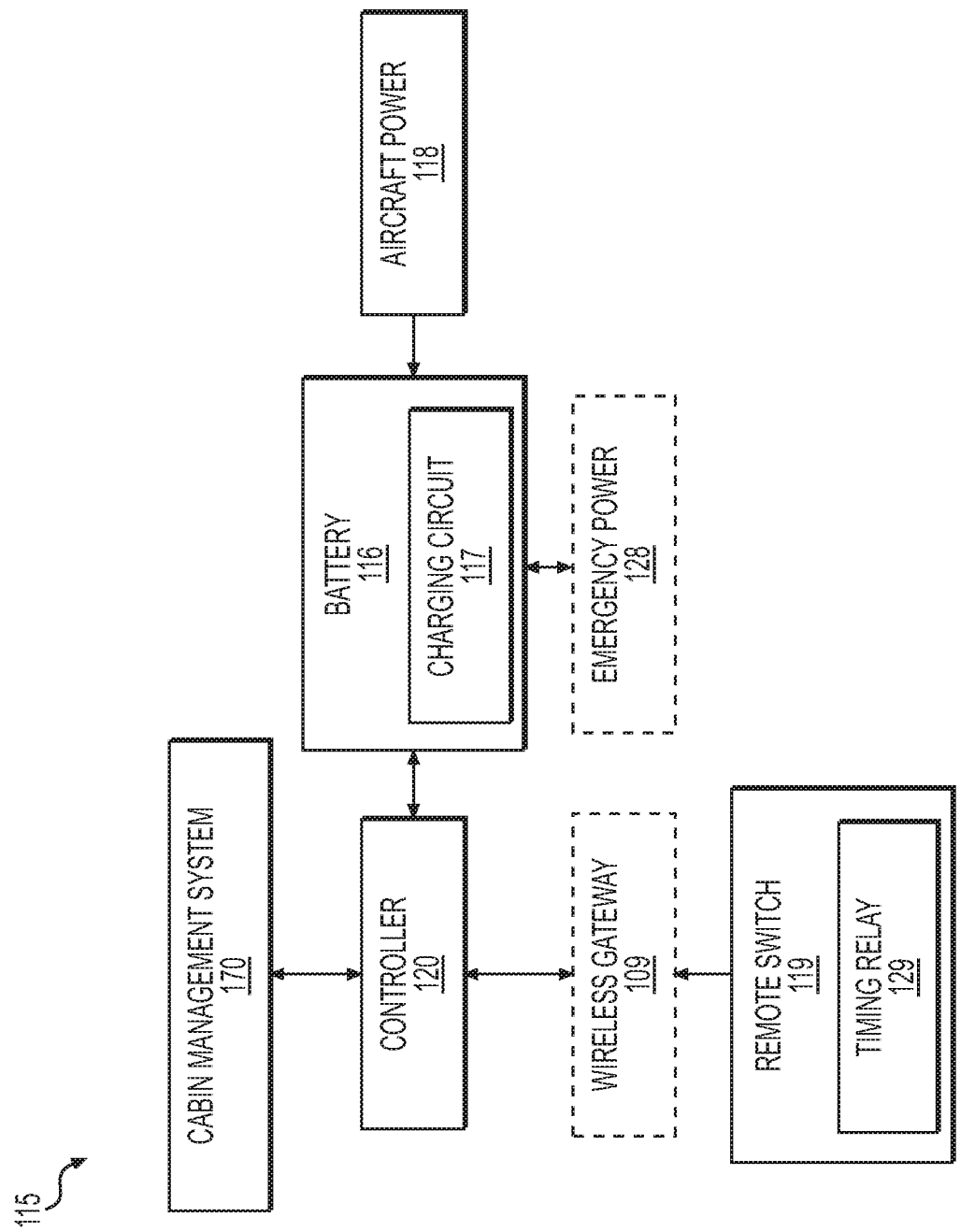
FIG. 2 is a block diagram of battery related portions of the control architecture of FIG. 1.

FIG. 2 is a block diagram of portions of control architecture 115 related to battery system 116. In certain embodiments, battery system 116 provides all electrical power for seat 100. Controller 120 monitors and manages battery system 116, including recharging from main aircraft power 118, intelligent load shedding, battery maintenance, and safety (e.g., thermal runaway, over-current conditions, ground fault interrupts). Smart charging of battery system 116 includes providing a trickle charge to the batteries while the aircraft's main power is on to ensure that the batteries maintain a full charge.

In the event of a full loss of electrical power in the aircraft, battery system 116 maintains power for movement of the seat, including ample power for positioning seat 100 in the TTOL position. Another benefit provided by battery system 116 is the ability for the maintenance crew to move seat 100 without having to power up the aircraft or connect an auxiliary power cart.

Battery cells used in battery system 116 are rechargeable batteries of any type (e.g., Li-Ion, NiCd, Ni—MH, Li-poly, Li—Mn2O4, etc.) that have been approved for flight. The battery cells may be co-located in seat 100 or in another location onboard the aircraft and configured as a single battery pack or a bank of battery packs.

A charging circuit 117 provides a trickle charge to the battery cells from main aircraft power 118 when available. A trickle charge provides a slow charge and a low current draw, which is intended to keep the seat battery cells fully charged without taxing the main aircraft power system. Initially during a flight, a high current draw may be needed for moving seats, but as the flight progresses, the seat movements will be limited and require minimal electrical power. During these low use times, charging circuit 117 slowly recharges the battery. The amount of charging current supplied to the battery is monitored (e.g., via controller 120). The state of the battery (e.g., state-of-charge, battery temperature, current draw, time to full charge) and the state of the main aircraft power system (e.g., available or not available) is monitored via controller 120. A timing relay 129 may be provided for determining when the batteries may be used so as to not prevent complete discharge of the battery and to provide a limited time for seat movement. Timing relay 129 also assists with ensuring that enough electrical power is available for the flight crew to command the seat into the TTOL position.

A remote switch 119 is used to power on seat 100, which also initiates the timing relay 129. This provides the flight crew and/or maintenance crew the ability to actuate seat 100 without having main ship power available. Remote switch 119 also provides a means for commanding seat 100 to a TTOL position by the flight crew. In certain embodiments, remote switch 119 is provided within crew interface 139. Remote switch 119 provides a separate connection to seat 100 from CMS 170 because, in the event of a power loss, CMS 170 may be disabled. For safety requirements, remote switch 119 can be used to move seat 100 to the TTOL position even when the CMS system is unavailable. Additionally, if the aircraft loses main power, controller 120 determines the loss of power and displays a prompt on user interface 130 to actuate the seat to the TTOL position. In operation, when the remote switch is activated, battery system 116 draws power from the batteries for a limited time, as controlled by timing relay 129.

In certain embodiments, battery system 116 is adapted to provide emergency power 128 to the aircraft. For example, the aircraft's emergency lighting system may be powered via battery system 116 to meet FAA emergency lighting requirements.

The charging circuit of battery system 116 prevents large current draws from the main aircraft power system, especially if multiple seats are commanded to move simultaneously, which allows the user to allocate the main aircraft power to other sources during high use periods such as boarding and right after landing.

Seat User Interface

Figure 3:
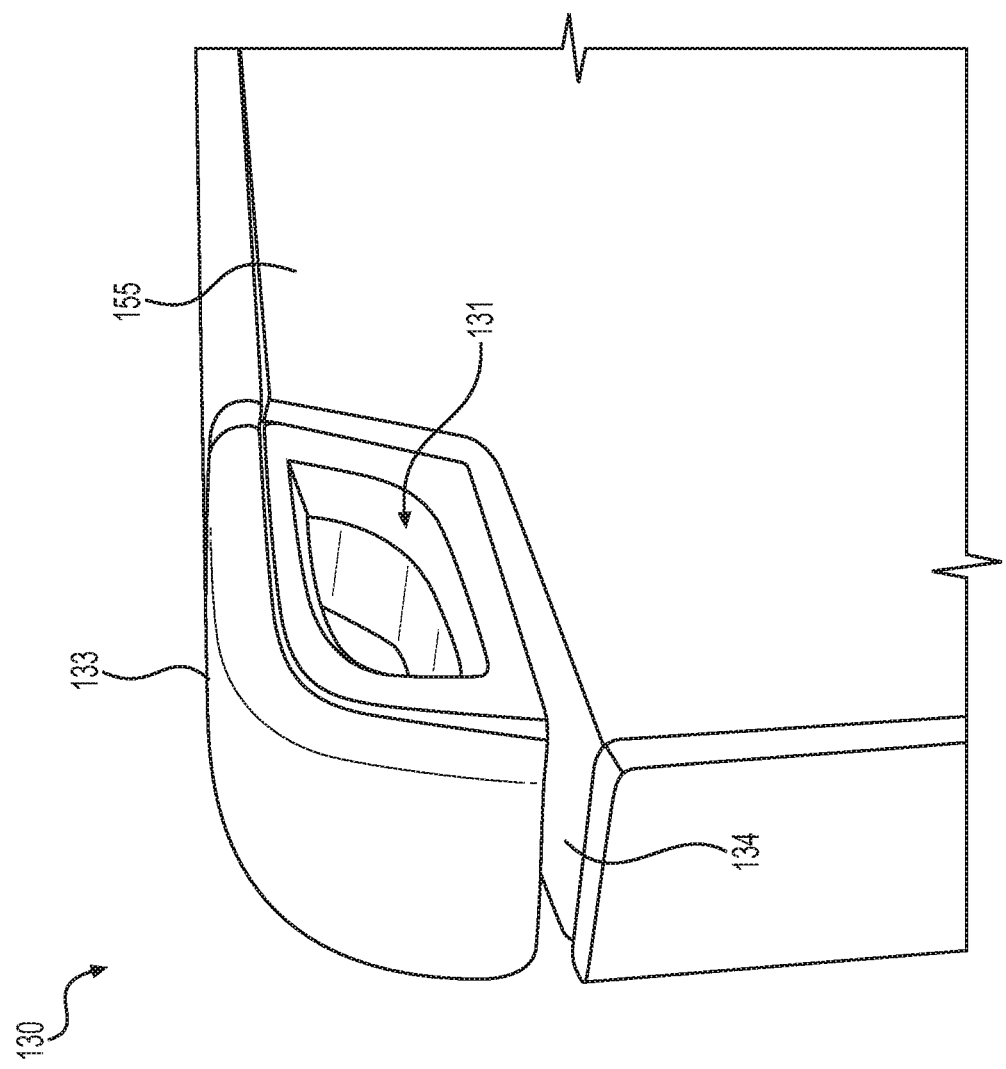
FIG. 3 is a perspective view of a user interface incorporated into an armrest of the aircraft seat, in an embodiment.
Figure 4:
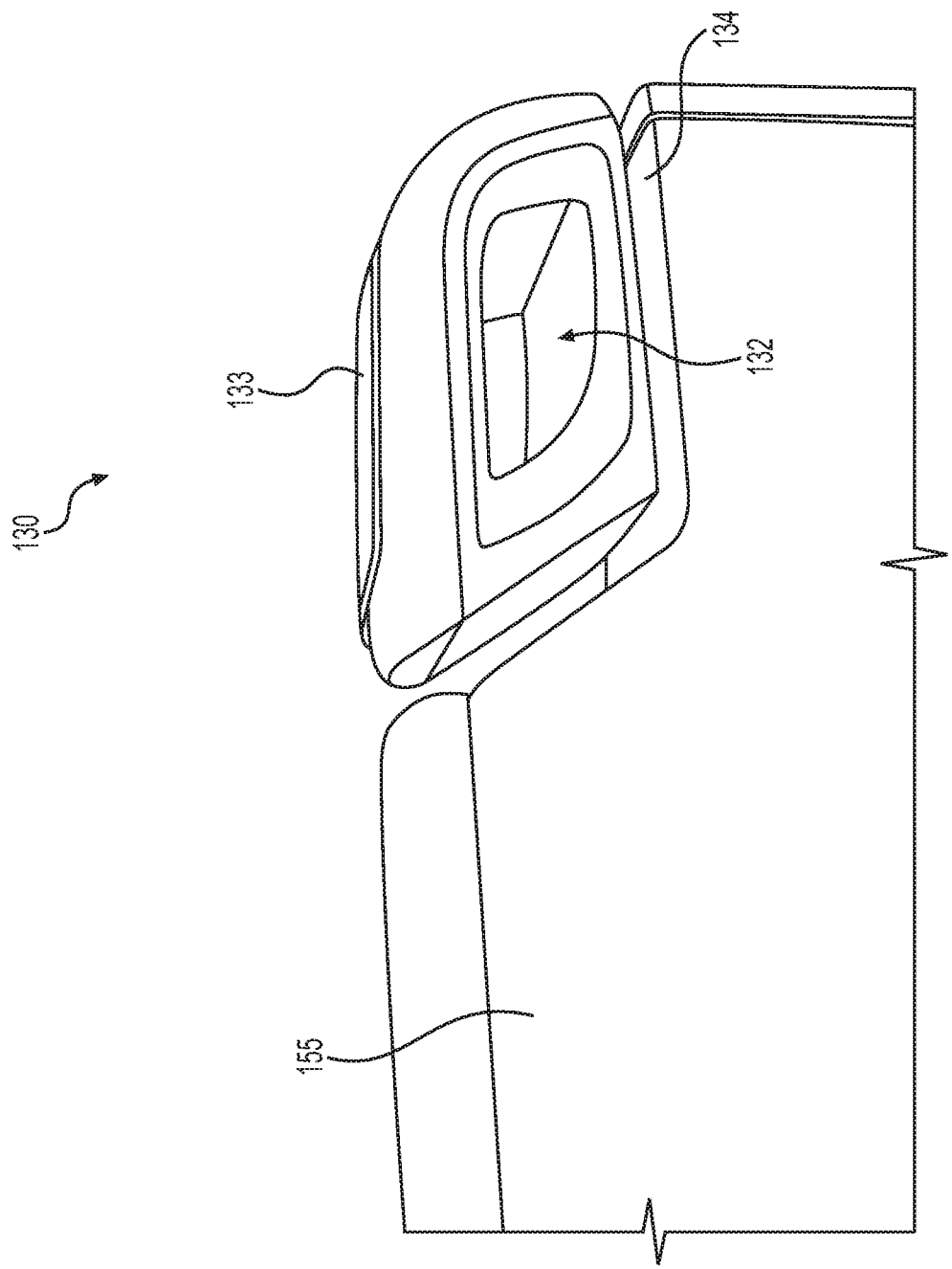
FIG. 4 is another perspective view of the user interface of FIG. 3.
Figure 5:
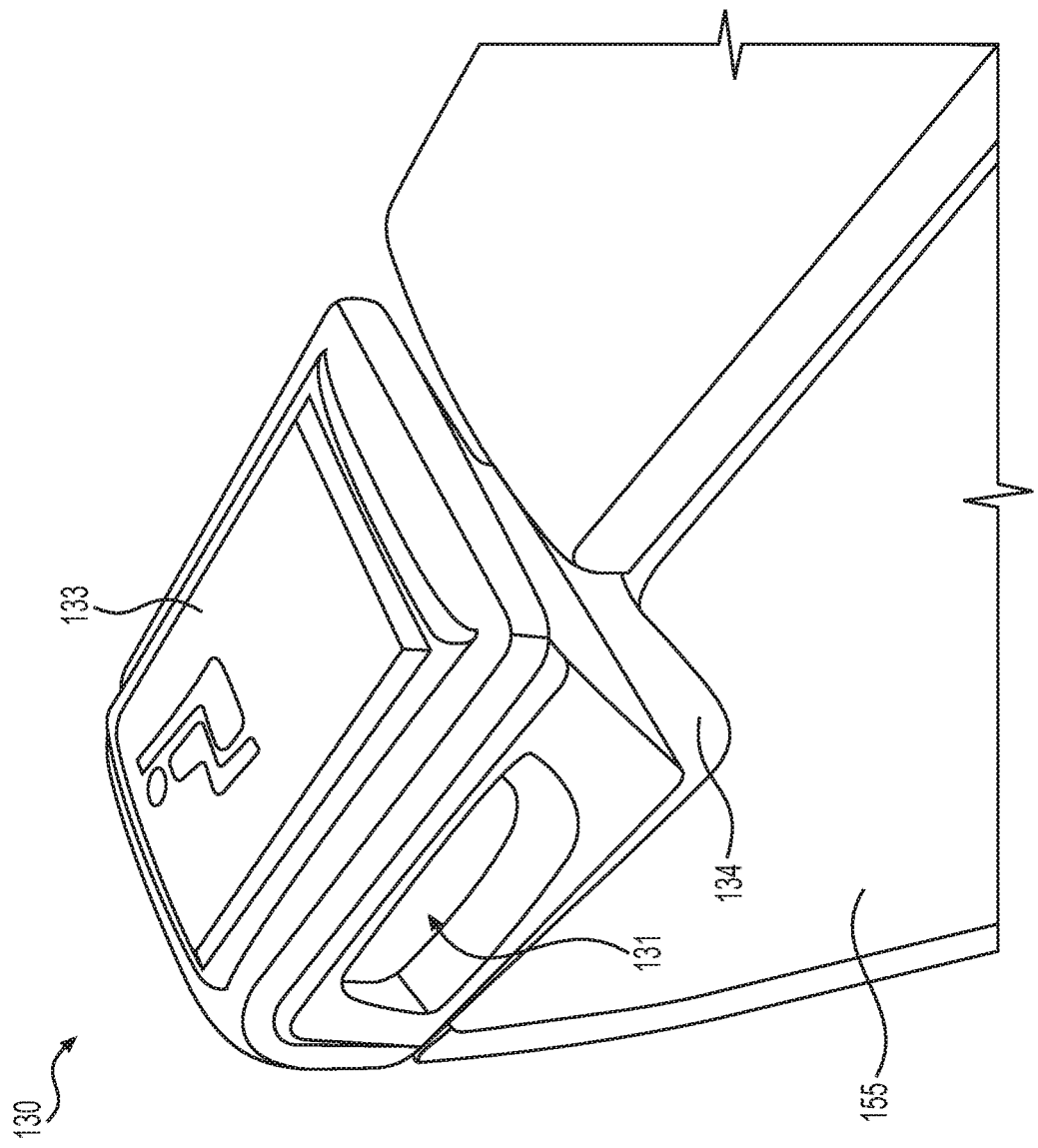
FIG. 5 is yet another perspective view of the user interface of FIG. 3.

FIGS. 3-5 illustrate perspective views of an exemplary user interface 130 incorporated into an armrest 155 of seat 100. Typically, multiple pushbuttons and/or levers are used to articulate an aircraft seat into various configurations (e.g., reclining, TTOL, sleeping, etc.). User interface 130 provides a single interface in a compact, intuitive and unique form factor that allows the user to articulate seat 100 into a range of possible positions. User interface 130 also provides user access to other seat features (e.g., heating/cooling, massage) as well as access to CMS 170. Specifically, user interface 130 includes a "joystick" feature for commanding translation in the forward, backward, left, right, up, and down directions, as well as rotation in the swivel left and swivel right directions, and tilting of the seat base. The full range of motion and degrees of freedom are accomplished through hexapod seat base 180, described below. User interface 130 enables adjustment of seatback 151, seatback angle 152, headrest position 153, footrest position 154, armrest positions 155, and rib bolster positions 156 via the joystick feature.

In certain embodiments, the joystick feature is provided by moving the entire user interface 130 with a user's hand. As depicted in FIGS. 3-5, user interface 130 is disposed on a platform 134 of armrest 155 via a six DOF actuator (not shown). The user may initiate use of the joystick feature (e.g., via a dual-touch function described below) such that the entire user interface 130 becomes moveable in six DOF for moving seat 100 according to movements of user interface 130 (e.g., translate and tilt forward/aft, translate and tilt side-to-side, translate up/down, and swivel). In certain embodiments, user interface 130 has a single mechanical connection with armrest 155. The single mechanical connection is for example a small mechanical tube with a hollow interior for wiring to pass through. Output signals based on motion of user interface 130 (e.g., via mechanical systems, infrared systems, or other technologies) are used by controller 120 to determine motions directed by the user. The joystick feature of user interface 130 is activated by a dual-touch function, described below. When the dual-touch function is not activated, the joystick is prevented from providing an output signal and may be fixed in a default position.

User interface 130 includes a dual-touch function as a safety feature to prevent inadvertent, unwanted and accidental movement of the seat. The dual-touch function uses a two-point sensor, with a first sensor 131 on one side of user interface 130 and a second sensor 132 on the opposite side of user interface 130. Only when touched simultaneously is movement of seat 100 permitted. For example, first sensor 131 may be located on the inboard side of the user interface 130 and second sensor 132 may be located on the outboard side of the user interface 130. A user may place their thumb on first sensor 131 and at least one finger on second sensor 132. In the embodiment depicted in FIGS. 3-5, the sides of user interface 130 (e.g., where sensors 131, 132 are located) each have an inset portion or aperture. In the case of an aperture, sensors 131, 132 are for example capacitance type switches that allow the entire aperture on each side of user interface 130 to function as a sensor. Alternatively, the inset portions include a plating, and sensors 131, 132 are integrated into each plating such that a user simply has to simultaneously touch each plating on both sides of user interface 130 to activate the joystick feature. Once both sensors 131, 132 have been simultaneously touched for a predetermined duration (e.g., one second), controller 120 issues a command for activating movement of the joystick. For example, the joystick may be pulled upward to raise the seat height and the joystick may be twisted for swiveling the seat base. Simultaneously pulling up on the front of the joystick while pushing down on the back of the joystick produces a motion of tilting the front of the seat base upwards while dropping the back of the seat base downwards for reclining, as further described below in connection with FIGS. 6-10.

User interface 130 further includes a touch screen 133 for displaying information and receiving touch inputs by the user. The joystick feature of user interface 130 does not need to be activated in order to use touch screen 133. The inset apertures on both sides of user interface 130 provide improved ergonomics and enable a user to insert their thumb on one side and fingers on the opposite side, which helps anchor the hand so that the index finger may manipulate touch screen 133 during turbulence. The touch inputs may be used to control footrest deployment, headrest deployment, massage, heating and cooling, seatback extension, rib bolstering, and reclining. Touch screen 133 also provides the user with access to CMS 170 for control of aircraft amenities such as, but not limited to lighting, window shades, audio controls (e.g., stations and volume control), attendant call, video control and passenger identification. For example, touch screen 133 may display one or more menus and additional information on a plurality of "pages" that may be scrolled through via touch gestures applied by a user's finger tips to touch screen 133. The joystick may be configured for scrolling or selecting items displayed on touch screen 133. For example, the joystick may be used to command window shades to deploy from a "shades" menu.

Hexapod Seat Base

Conventional aircraft seats lack height adjustability for accommodating occupants of different heights. Additionally, conventional seats do not provide any active means to counteract vibrations experienced onboard aircraft (e.g., due to air turbulence). Embodiments of the present disclosure provide a hexapod seat base 180 having six degrees-of-freedom (DOF) for articulating an aircraft seat, such as seat 100. Hexapod seat base 180 may be controlled to provide height adjustability, inboard/outboard tracking, forward/aft tracking, tilting of a seat bottom forward/aft and side-to-side, and swiveling of the seat bottom. Active vibration control is provided to actively damp vibration during all phases of flight.

Figure 6:
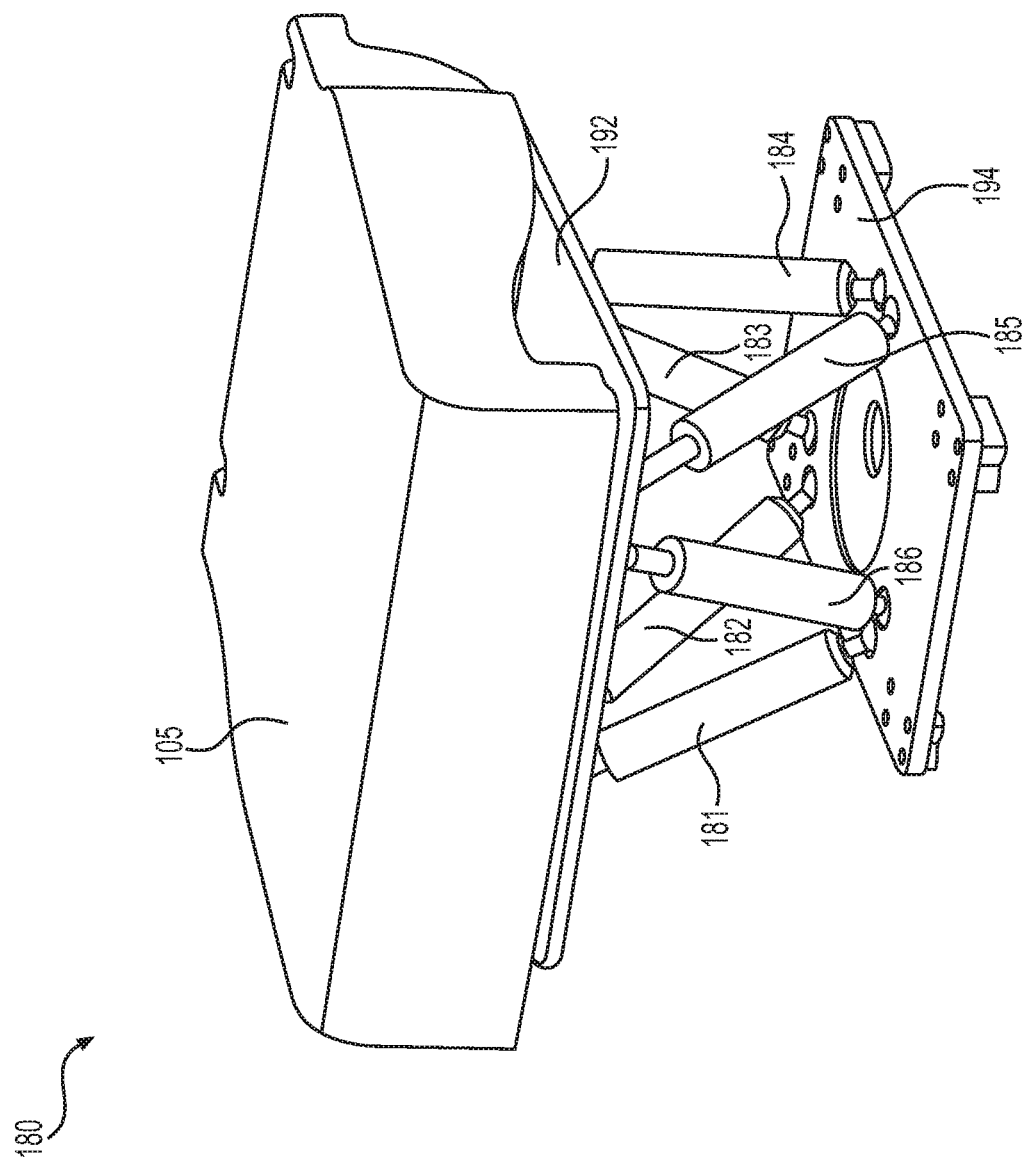
FIG. 6 is a perspective view of a hexapod seat base, in an embodiment.

FIG. 6 is a perspective view of an exemplary hexapod seat base 180. Hexapod seat base 180 includes a plurality of linear actuators adapted to support seat base 180. In the embodiment depicted in FIG. 6, the plurality of linear actuators include a first linear actuator 181, a second linear actuator 182, a third linear actuator 183, a fourth linear actuator 184, a fifth linear actuator 185, and a sixth linear actuator 186. In certain embodiments, the plurality of linear actuators 181-186 are arranged in a hexapod configuration as further described below in connection with FIG. 9 and FIG. 10. Linear actuators 181-186 may each be an electro-mechanical actuator, a hydraulic actuator, or a pneumatic actuator, having a piston/rod arrangement, for example. Each of the linear actuators 181-186 are controllable via controller 120, as described below in connection with FIG. 7. Linear actuators 181-186 are adapted to be leakproof and to provide quiet and instantaneous movement.

A seat bottom 105 is supported by linear actuators 181-186 and adapted for an occupant to sit upon. A seat member 192 is for example a stiff plate that provides a rigid member for mechanically coupling linear actuators 181-186 with seat bottom 105. A base plate 194 provides a rigid member for mechanically coupling linear actuators 181-186 to a floor of the aircraft via for example rails (not shown). Other portions of seat 100 (e.g., seatback, armrests, a footrest, etc.) are not depicted in FIG. 6 for clarity of illustration. Mechanical coupling of linear actuators 181-186 between seat member 192 and base plate 194 may be by a pivoting clevis, gimbal, or other mechanism capable of rotating and pivoting, as further described below in connection with FIG. 9 and FIG. 10. Controller 120 coordinates extension/retraction of linear actuators 181-186 to provide motion of seat member 192 in six DOF, namely translation of the seat member vertically, horizontally and longitudinally, tilting seat member 192 about the pitch and roll axes of the aircraft, and twisting the seat member about the yaw axis of the aircraft (e.g., swiveling).

Figure 7:
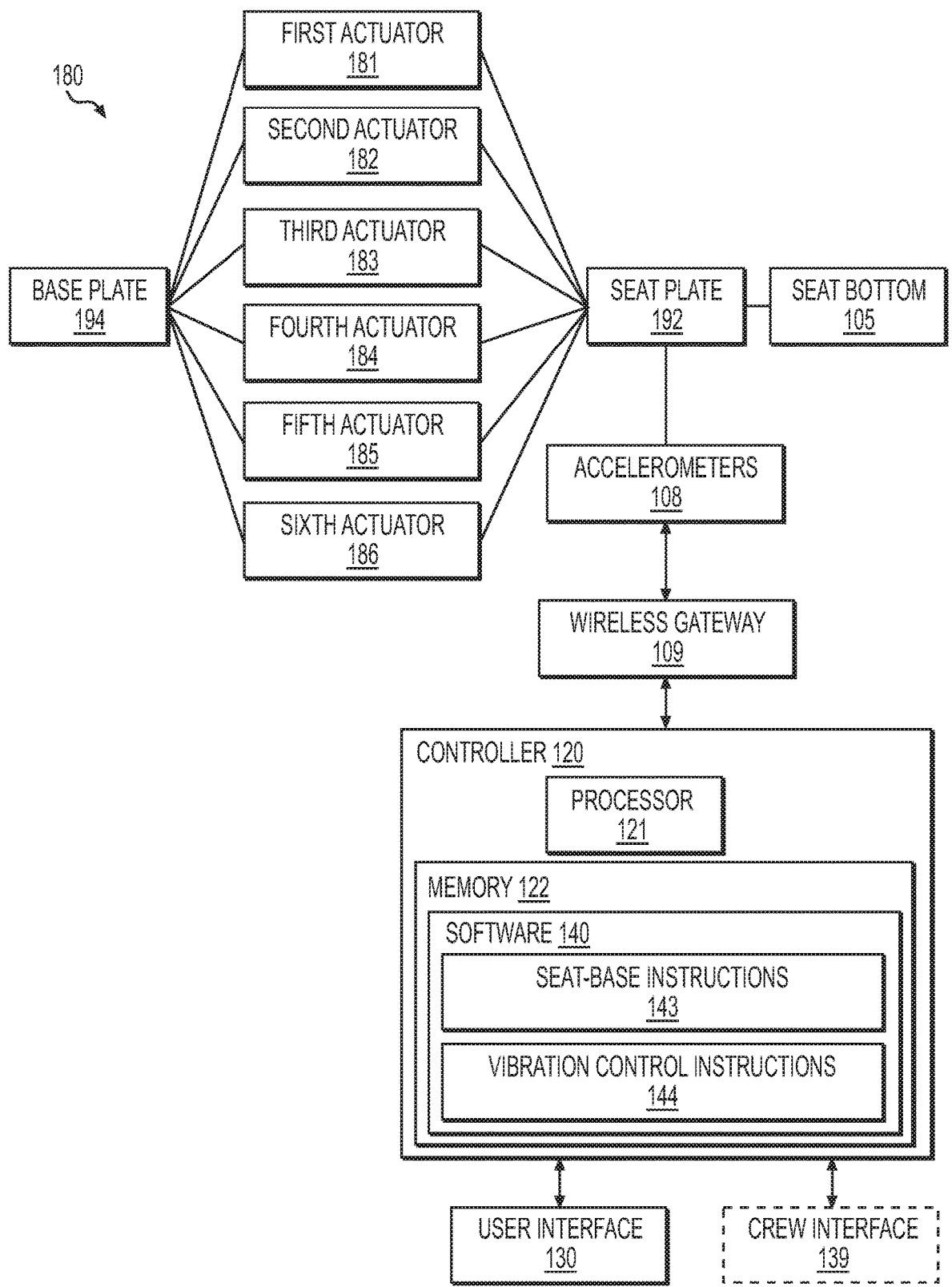
FIG. 7 is a block diagram of the hexapod seat base of FIG. 6, in an embodiment.

FIG. 7 is a block diagram of hexapod seat base 180, FIG. 6. Components enumerated with like numerals from FIGS. 1 and 6 are the same and their description may not be repeated accordingly. One or more accelerometers 108 may be used to provide acceleration information to controller 120. Signals of vibration information from the one or more accelerometers 108 are used to produce a vibration profile of seat base 180, as further described below in connection with FIG. 8. Controller 120 recognizes turbulence within the aircraft based on information received from accelerometers 108.

In certain embodiments, the one or more accelerometers 108 may include three accelerometers oriented perpendicular to one another along a three-axis (e.g., X, Y, Z) coordinate system. Accelerometers 108 may be mounted to seat member 192 beneath seat bottom 105; however, the accelerometers 108 may be mounted to any substantially rigid structure of seat 100 without departing from the scope hereof. Some aircraft have accelerometers located at the center-of-gravity of the aircraft, and information from these may be used in place of, or to supplement, accelerometers 108.

In certain embodiments, the one or more accelerometers 108 includes a single accelerometer device capable of providing acceleration information in six DOF. In some embodiments, a first accelerometer device having six DOF is mounted to base plate 194 and a second accelerometer device having six DOF is mounted to seat member 192 for enabling a closed-loop control via controller 120 that minimizes vibration of seat member 192 as further described below. Alternatively, information from one or more accelerometers located elsewhere onboard the aircraft (e.g., at the center-of-gravity) may be used with the second accelerometer device for performing closed-loop control. The accelerometers may be communicatively coupled with controller 120 via a wired and/or wireless communication medium. In certain embodiments, the accelerometers are communicatively coupled with controller 120 via wireless gateway 109.

Returning to FIG. 7, software 140 may include a set of seat position instructions 143 and a set of vibration-control instructions 144. Seat position instructions 143 provide commands to linear actuators 181-186 for altering their length in a coordinated manner to adjust seat base position (e.g., forward/aft, height, tilt, swivel). Similarly, vibration control instructions 144 provide commands to linear actuators 181-186 for altering their length in a coordinated manner to mitigate seat vibration. Instructions 143, 144 include algorithms for calculating the appropriate commands. For example, algorithms of vibration control instructions 144 provide signal processing algorithms, calculations for a vibration profile, and derivation of command signals to transmit to linear actuators 181-186 for damping seat vibration. Instructions 143, 144 may include control loops such as those of a proportional-integral-derivative (PID) controller, for example. Exemplary steps of vibration-control instructions 144 are described below in connection with method 300, FIG. 8.

User interface 130 is communicatively coupled with controller 120 to enable a user to provide input for commanding seat base 180. In certain embodiments, user interface 130 includes a physical switch (e.g., a joystick, rocker switches, etc.), a membrane switch, and/or a touchscreen located on an armrest of the seat and/or a side-ledge in the aircraft cabin. In the embodiment depicted in FIGS. 3-5, touchscreen 133 is adapted for receiving input from the user via touch gestures (e.g., via interactive buttons and/or menus displayed on the touchscreen). In some embodiments, controller 120 receives inputs from an application on a personal electronic device (e.g., a smartphone or tablet). User interface 130 may be used to display information such as a menu of user preferences (e.g., preset heights customized for individual users) or a menu of position information for seat bottom 105, such as a height, a tilt angle, a swivel angle, an inboard/outboard position, and a forward/aft position.

In operation, linear actuators 181-186 each extend/retract in a coordinated manner under control of controller 120 based on information from the one or more accelerometers 108 to actively damp vibrations experienced at seat base 180. This mitigates vibrational effects at seat bottom 105 due to air turbulence and aircraft landing. Additionally, linear actuators 181-186 may be used to control the seat position. For example, controller 120 may simultaneously control linear actuators 181-186 using seat position instructions 143 to adjust seat height, seat base tilt, and swivel. For example, seat bottom 105 may be adjusted with a tilt of plus/minus thirty-degrees, and a swivel rotation of plus/minus forty-five degrees based on input commands from a user (e.g., via user interface 130).

Hexapod seat base 180 provides feedback (e.g., via a feedback loop) to controller 120 including information about where each of linear actuators 181-186 is positioned/extended such that controller 120 maintains the current status of seat base 180. The positional information may be used for calculating the subsequent movements. Controller 120 monitors and processes data from proximity and positions sensors 158 to determine if the commanded movement will interfere with an object within the operational envelope.

Figure 8:
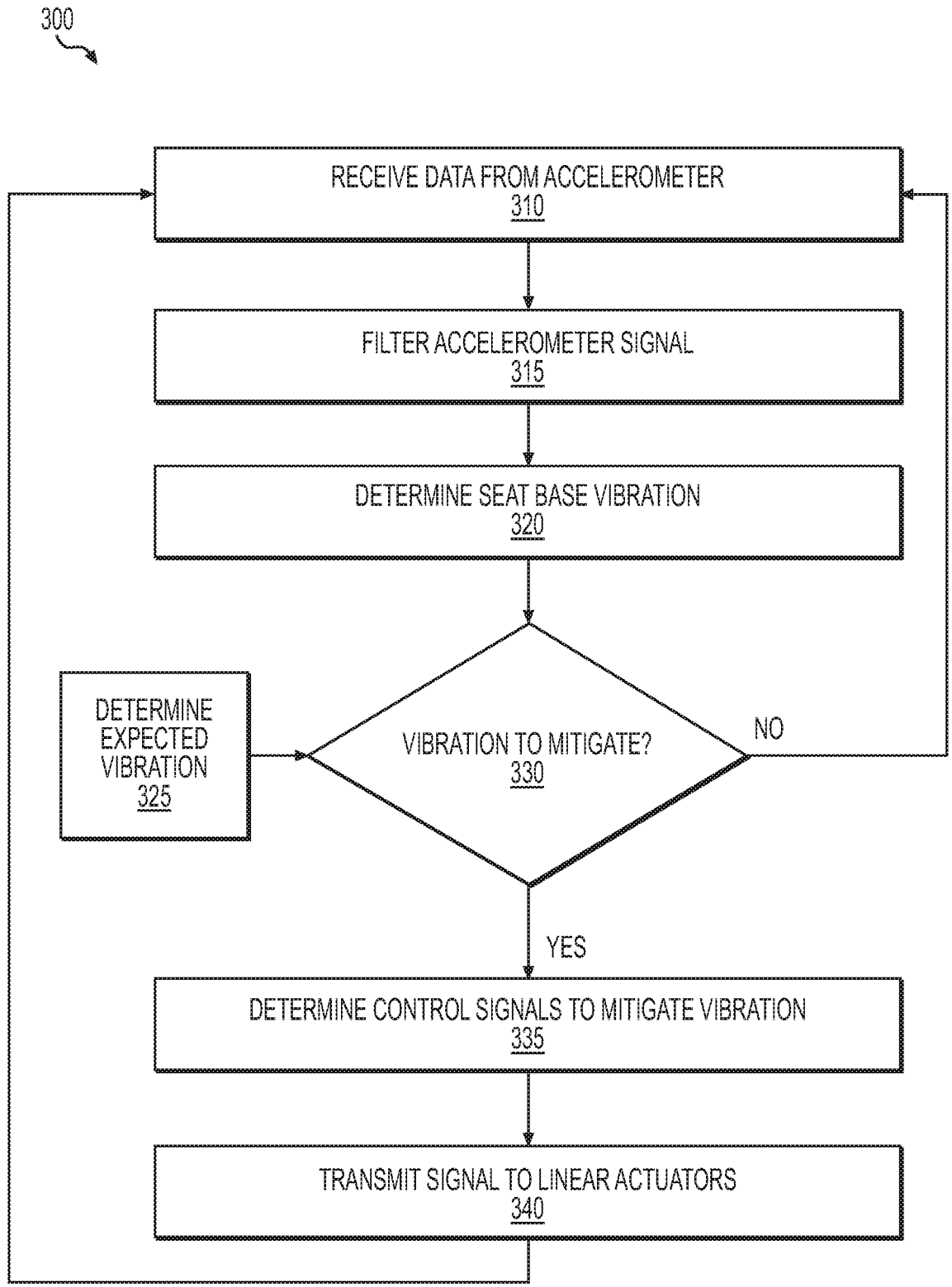
FIG. 8 is a block diagram of a method of vibration mitigation during aircraft flight using the hexapod seat base of FIG. 6, in an embodiment.

FIG. 8 is a block diagram of a method 300 of vibration mitigation using hexapod seat base 180 of FIG. 6 during aircraft flight. Steps of method 300 may be carried out via controller 120 using vibration control instructions 144 of FIG. 7, for example. Method 300 provides active vibration mitigation for reducing vibrations of seat 100 to provide a smooth flight and landing for the user, despite any air turbulence, aircraft vibration, or impact during landing. Method 300 includes receiving vibration data from one or more accelerometers 108 mounted to seat 100, determining a vibration profile of seat 100 based on the vibration data, and determining whether vibration mitigation is warranted. When vibration mitigation is warranted, method 300 includes determining control signals for damping vibration and transmitting the control signals to linear actuators 181-186 adapted to support seat 100. The method may also be extended for use during taxiing of aircraft.

In a step 310, data is received from an accelerometer. In an example of step 310, controller 120 receives data from one or more accelerometers 108 mounted to a rigid portion of a seat, such as seat member 192. In certain embodiments, controller 120 receives the accelerometer data via wireless gateway 109. The received data may be in the form of one or more analog or digital signals corresponding to the one or more accelerometers, respectively.

In an optional step 315, an accelerometer signal is filtered. In an example of step 315, signal processing devices and/or software instructions are used to filter the one or more data signals received from one or more accelerometers 108 (e.g., to remove signal noise). In certain embodiments, portions of the accelerometer signal may be filtered (e.g., cutout frequencies).

In a step 320, a seat base vibration is determined. In an example of step 320, controller 120 determines a level of vibration on hexapod seat base 180 based on the filtered accelerometer signal from the one or more accelerometers 108. In certain embodiments, controller 120 determines the content/characteristics of the collective accelerometer signals.

In an optional step 325, an expected vibration is determined. In an example of step 325, controller 120 determines an expected level of vibration for seat base 180. The expected level of vibration may include a lower limit or threshold for ignoring certain vibrations (e.g., vibrations of low amplitude and/or low frequency). In certain embodiments, the expected vibration level may be based on a phase of flight. For example, a positive acceleration upward (in the Z-axis) and a nose-up pitch are expected during portions of liftoff and climb. Conversely, a negative acceleration in the Z-axis and a nose-down pitch are expected during portions of descent. During banked turns, a change in roll is expected. During level-steady flight and the while taxiing, accelerations and changes to pitch and roll are not expected. Controller 120 may receive data from avionics of the aircraft for determining the phase of flight, and controller 120 may receive the intended pitch/roll/yaw and X-, Y-, and Z-axis accelerations based on command inputs from a pilot control wheel or autopilot servo. Controller 120 then determines the expected level of vibration while considering any accelerations anticipated due to phase of flight or command inputs. Alternatively, optional step 325 is avoided and method 300 attempts to mitigate all seat base vibration from step 320. In this case, the signal filtering in step 315 may be used to establish a lower limit or threshold, or to ignore cutout frequencies.

In some embodiments, controller 120 determines signals to counteract aircraft motion with hexapod seat base 180. For example, based on command inputs from the pilot or autopilot and/or acceleration data from accelerometers 108, controller 120 determines that the aircraft is banking a turn and tilts seat base 180 to partially or fully counteract the banked turn. Likewise, during liftoff and landing, controller 120 determines how the aircraft is pitched and tilts the seat base 180 to partially or fully counteract the aircraft pitch.

A step 330, is a decision to determine if a vibration exists that warrants mitigation. If in step 330 controller 120 determines that the seat base vibration from step 320 exceeds the expected vibration from step 325, then a vibration requiring mitigation exists and method 300 proceeds with step 335 for mitigating that vibration. Otherwise method 300 returns to step 310 to repeat the process. In this manner, method 300 continually monitors vibrations of hexapod seat base 180 and continually determines if a vibration to mitigate exists while in operation. When step 325 is avoided, a lower limit or minimum threshold may be used to determine if the seat base vibration warrants mitigation.

In a step 335, control signals are determined to mitigate vibration. In an example of step 335, controller 120, using vibration control instructions 144, determines mitigation control signals for linear actuators 181-186, respectively, for mitigating vibration of seat base 180. The vibration control instructions 144 may include a PID controller for example for iteratively reducing vibration of seat base 180 as method 300 is performed repetitively. The vibration control instructions 144 may determine the mitigation control signals based on phase of flight, the vibration profile of the aircraft or base plate 194, and the current position of seat 100, among other things.

In a step 340, mitigation signals are transmitted to the linear actuators. In an example of step 340, controller 120 transmits the mitigation control signals determined in step 330 to linear controllers 101-106, respectively, via one of a wired and/or wireless communication medium.

Following step 340, method 300 returns to step 310 to repeat the process. In this manner, method 300 continually monitors vibrations of hexapod seat base 180 while in operation to iteratively reduce vibration for providing active turbulence and vibration mitigation.

In certain embodiments, vibration control may be applied in less than six DOF. For example, the largest component of vibration due to turbulence and landing is expected in the Z-axis (vertical) direction. Accordingly, method 300 may be used to actively mitigate vibrations in the Z-axis while ignoring movement in other directions. More than one mode of operation may be provided; for example, a full stabilization mode actively mitigates vibrations in all directions, while a simple damping mode actively mitigates vibrations in the Z-axis only. The mode of operation may optionally be selectable by a user via user interface 130.

Figure 9:
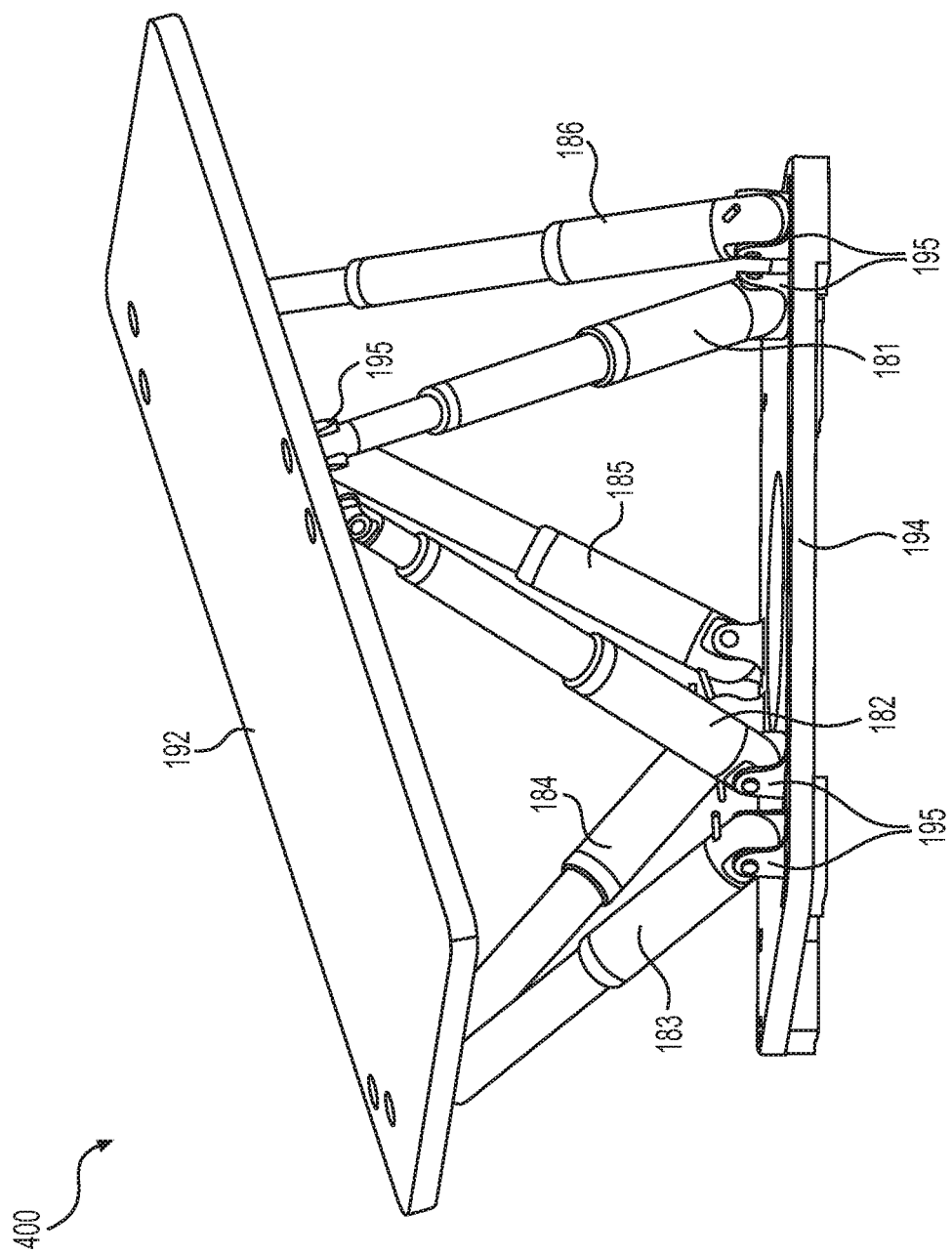
FIG. 9 is a perspective view of a hexapod seat base, in an embodiment.
Figure 10:
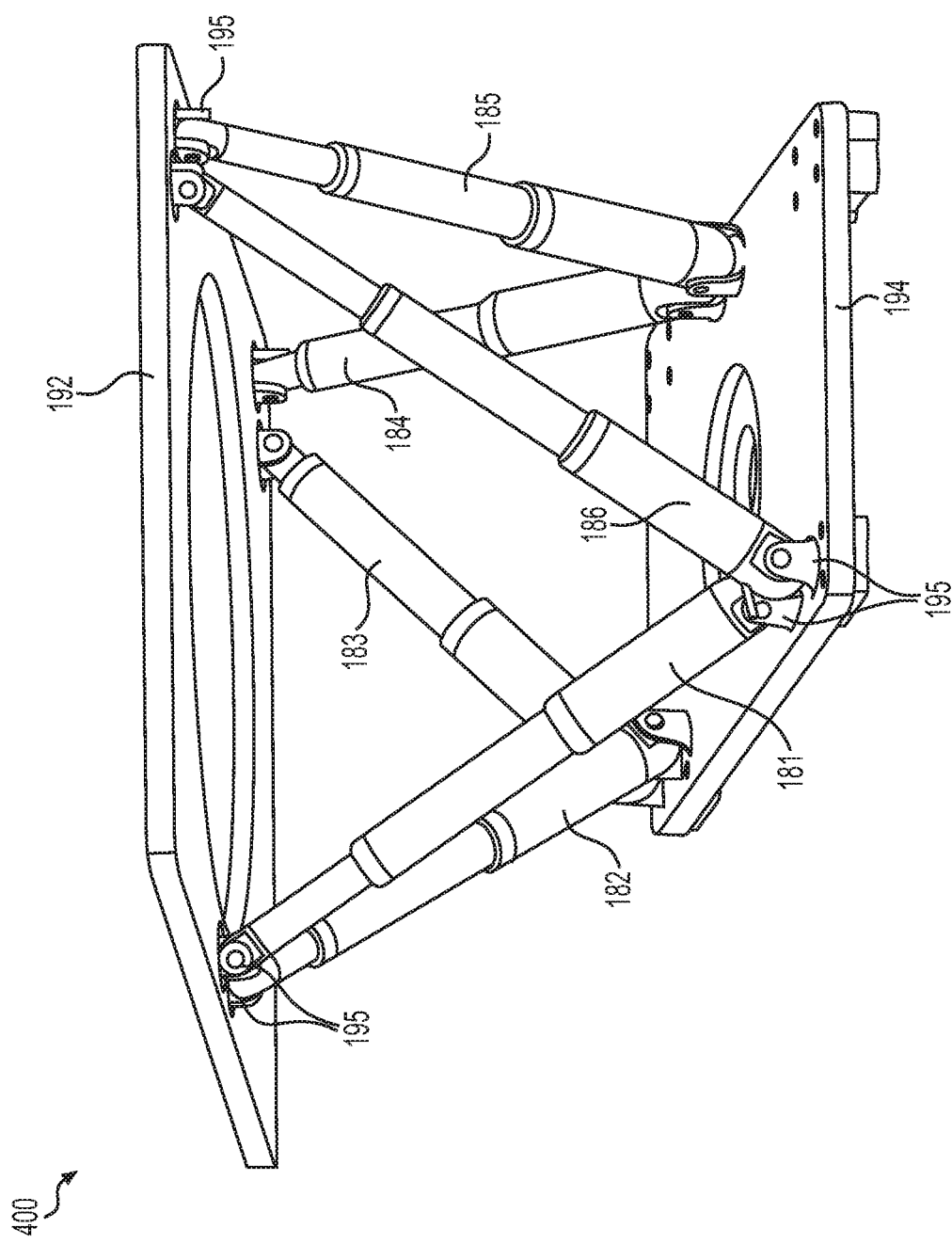
FIG. 10 is another perspective view of the hexapod seat base of FIG. 9.

FIG. 9 and FIG. 10 provide perspective views of an exemplary hexapod seat base 400. Hexapod seat base 400 is an example of hexapod seat base 180, FIG. 6. Components enumerated with like numerals are the same or similar and their description may not be repeated accordingly. In the views depicted in FIG. 9 and FIG. 10, seat bottom 105 of FIG. 6 is not shown, and seat member 192 is tilted.

The linear actuators 181-186 of seat base 400 may include a two-section or three-section telescoping piston/rod arrangement. The number of sections may be varied depending on the adjustment requirements of a particular seat, without departing from the scope hereof.

Mechanical coupling of linear actuators 181-186 between seat member 192 and base plate 194 may be by a pivoting clevis, gimbal, or other mechanism capable of rotating and pivoting. In the embodiment depicted in FIG. 9 and FIG. 10, a pivoting clevis 195 is used to pivotally couple linear actuators 181-186 with seat member 192 and base plate 194. Not all pivoting devises 195 are enumerated in FIG. 9 and FIG. 10 for clarity of illustration.

Linear actuators 181-186 may be arranged in a hexapod configuration, as best viewed in FIG. 10. For example, linear actuators 181-186 are each mounted by a first end to base plate 194 in pairs. Specifically, first actuator 181 and sixth actuator 186 are pivotally mounted to a first location on base plate 194; second and third actuators 182, 183 are pivotally mounted to a second location; and, fourth and fifth actuators 184, 185 are pivotally mounted to a third location of base plate 194. Similarly, linear actuators 181-186 are each mounted by a second end to seat member 192 in pairs. Specifically, first actuator 181 and second actuator 182 are pivotally mounted to a first location of seat member 192; third and fourth actuators 183, 184 are pivotally mounted to a second location of seat member 192; and, fifth and sixth actuators 185, 186 are pivotally mounted to a third location of seat member 192. The first, second and third locations on base plate 194 are interspersed with first, second and third locations on seat member 192.

Advantages of hexapod seat base 180 include an increase in the maneuverability of seat 100 and active vibration control for providing a smoother and more comfortable travel experience.

Seat Thermal-Control Fluid System

Embodiments of the present disclosure provide a thermal control system that circulates a fluid to provide heat transfer for heating and cooling. The fluid is preferably a non-aqueous propylene glycol solution, also known as a hydronic liquid. Heating/cooling may be applied to an aircraft seat (e.g., seat 100 of FIG. 12) or any internal feature of an aircraft that a user would want to heat/cool (e.g., flooring, work surfaces, panels, etc.). Additionally, embodiments of this disclosure are adapted to take advantage of hot and cold zones of an aircraft to offset electrical power requirements for altering the temperature of the fluid. For example, bleed air lines from an aircraft engine may be used to provide heat, and portions of the exterior skin of the aircraft may be used for cooling. A hybrid all-in-one dry-break connector provides a single connection for supplying hot and cold fluid, electrical power, and analog and digital signals to any feature requiring heating or cooling.

Prior methods for thermal control of aircraft seating include the use of heating pads, fans, and thermal electric generators (TEG). Producing heat via a heating pad or TEG requires a large amount of electrical current that is taxing on the electrical system of an aircraft. Cooling requires large amounts of air movement to remove heat by forced convection, and fans used to blow air generate unwanted noise.

Figure 11:
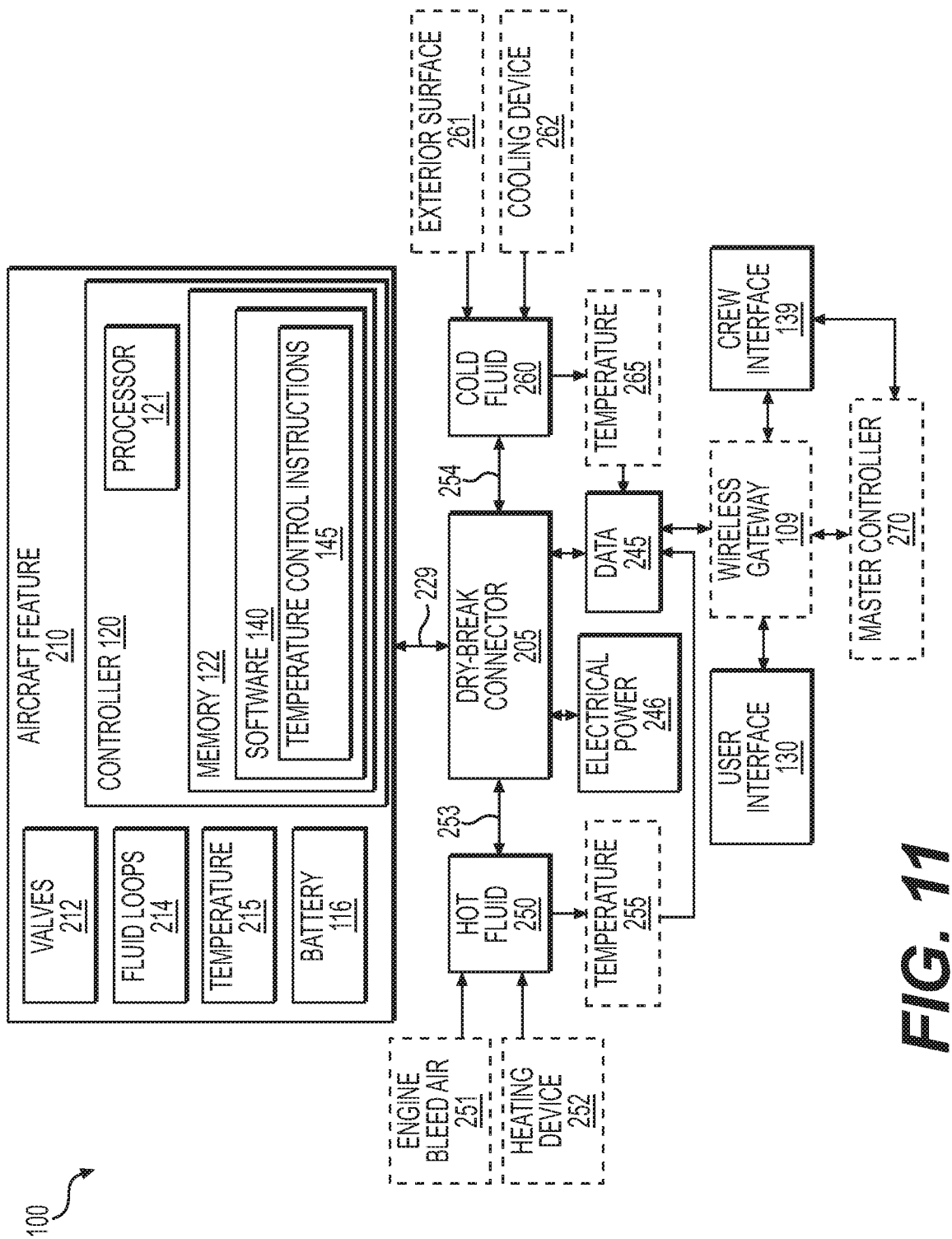
FIG. 11 is a block diagram of an aircraft fluid thermal control system, in an embodiment.

FIG. 11 shows an exemplary aircraft fluid thermal control system 200 for providing local temperature control at one or more locations onboard an aircraft. An aircraft feature 210 is any feature or component onboard an aircraft adapted to be temperature controlled via system 200. For example, aircraft feature 210 may be an aircraft seat (e.g., seat 100 of FIG. 12), cabin flooring, galley work surfaces, lavatory surfaces, interior panels (e.g., side-wall, window reveal, overhead), food/beverage storage compartments, and equipment racks, etc.

In certain embodiments, a plurality of aircraft features 210 (e.g., a plurality of aircraft seats 100) may receive temperature control using system 200. A hot fluid source 250 and a cold fluid source 260 provide hot and cold fluids for the entire system 200, respectively. For example, a system-wide hot fluid line 253 distributes hot fluid from hot source 250 throughout the aircraft, and a system-wide cold fluid line 254 distributes cold fluid from cold source 260 throughout the aircraft. In some embodiments, system-wide fluid lines 253, 254 each form a loop that distributes fluid throughout the aircraft and provides fluid directly from source 250, 260 to a feature 210. After passing through one or more aircraft features 210, the hot/cold fluid returns to its respective source 250, 260 for reheating/recooling. Valves are used to control distribution of hot/cold fluid from fluid lines 253, 254 to the one or more aircraft features 210. The valves are under control of a controller, such as controller 120 of FIG. 1.

In addition to hot and cold fluid 250, 260, data 245 and electrical power 246 are provided to each aircraft feature 210. Data 245 are transmitted/received between controller 120 and the aircraft's system architecture (e.g., CMS, RS-485 and CAN bus lines), and include analog and digital input/outputs (I/O's) and low-voltage data bus lines for transferring signals to and from controller 120. Electrical power 246 may be provided by any aircraft electrical power system including but not limited to a battery module, engine generator, ground cart, or auxiliary-power unit (APU). The hot and cold fluid 250, 260, data 245, and electrical power 246 are provided to each aircraft feature 210 via a hybrid all-in-one dry-break connector 205. The dry-break connector 205 is hermetically sealed and provides isolation between liquid and electrical connections to prevent electrical faults.

For an aircraft equipped with a plurality of features 210 adapted for thermal control using system 200, a plurality of dry-break connectors 205 provide a plurality of connections between shipside systems and a respective aircraft feature 210. This enables system 200 to be modular by providing a simple way to connect one or more aircraft features 210 to a system-wide hot and cold fluid 250, 260, data 245, and electrical power 246. For example, passenger seats may be replaced, moved to different locations, or additional seats may be added to the aircraft, and the seats may be easily added to system 200 for thermal control.

Figure 12:
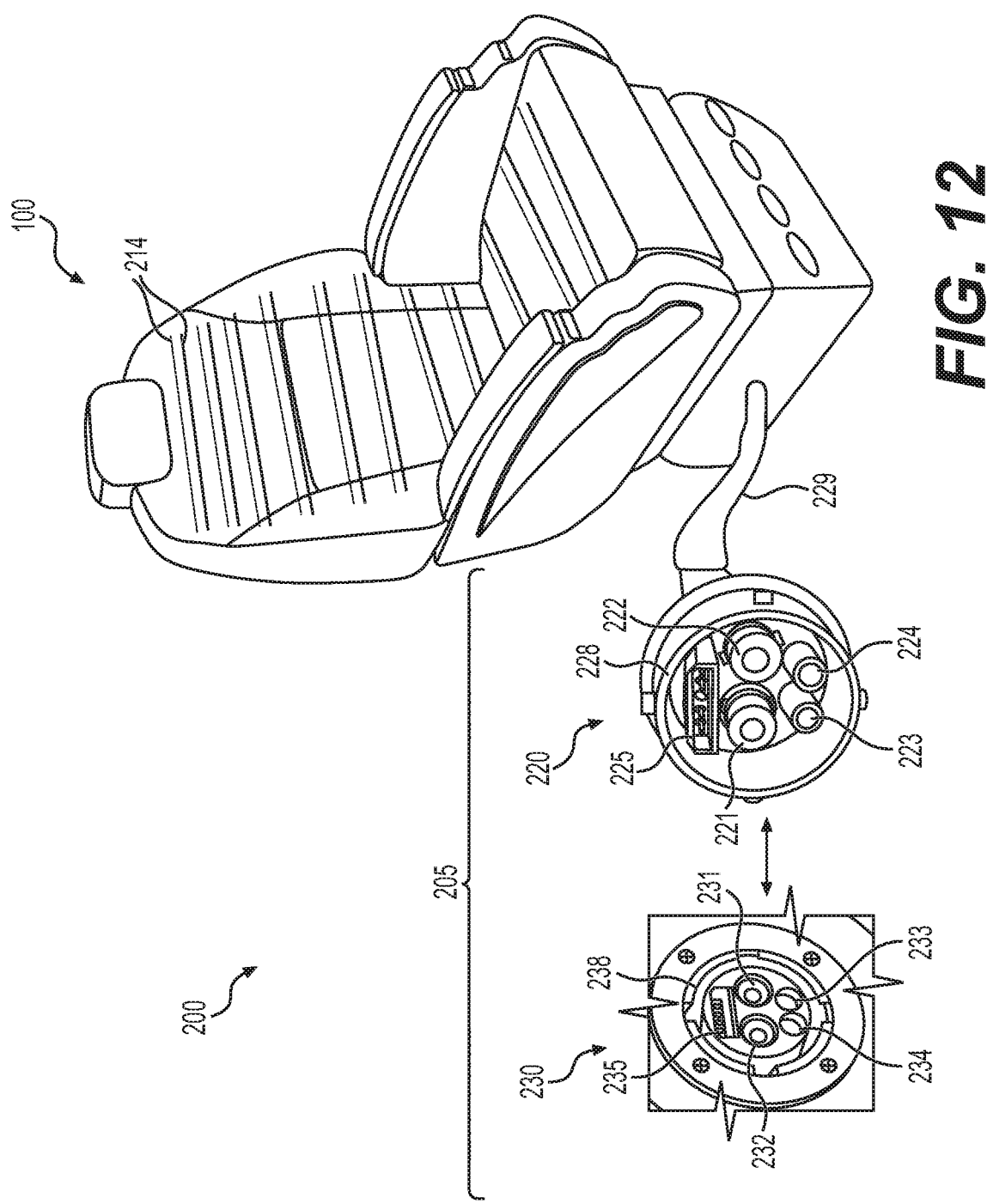
FIG. 12 shows an aircraft seat adapted for heating and cooling using the aircraft thermal fluid control system of FIG. 11, in an embodiment.

FIG. 12 shows aircraft seat 100 adapted for heating and cooling using the aircraft thermal fluid control system 200 of FIG. 11. Components enumerated with like numerals from FIG. 11 are the same or similar and their description may not be repeated accordingly. The hybrid all-in-one dry-break connector 205 includes a recipient end 220 and a source end 230. The recipient end 220 connects via cabling 229 to seat 100 and includes a hot fluid input 221, a cold fluid input 222, a hot fluid return 223, a cold fluid return 224, a data and electrical connector 225, and a quick-disconnect insert 228. Cabling 229 includes wires for electrical power, wires for data signal communication, and tubing for transporting fluids.

The source end 230 may be mounted in a wall or floor and includes a hot fluid output 231, a cold fluid output 232, a hot fluid return 233, a cold fluid return 234, a data and electrical connector 235, and a quick-disconnect receptacle 238. The recipient end 220 and the source end 230 are adapted for quickly connecting and disconnecting with each other. Specifically, hot fluid input 221 connects with hot fluid output 231, cold fluid input 222 connects with cold fluid output 232, hot fluid return 223 connects with hot fluid return 233, cold fluid return 224 connects with cold fluid return 234, data and electrical connector 225 connects with data and electrical connector 235, and quick-disconnect insert 228 connects with quick-disconnect receptacle 238. The hot fluid connections 221, 231 and 223, 233 and the cold fluid connections 222, 232 and 224, 234 are dry break connections, meaning that each of the lines includes a valve at or near the opening such that no fluid leaks upon separation of recipient end 220 from source end 230.

Returning to FIG. 11, each aircraft feature 210 adapted for thermal control via system 200 includes valves 212 used to control flow of fluid through fluid loops 214 embedded within the aircraft feature 210. Valves 212 are for example digital control valves that are controlled by controller 120. The fluid loops 214 include tubing disposed within the aircraft feature 210 such that the tubing is internally disposed against an outer layer or surface of the aircraft feature 210 for providing efficient heat transfer via conduction. For example, if feature 210 is a portion of floor, fluid loops 214 are disposed beneath and touching a surface or top layer of flooring. Alternatively, if feature 210 is aircraft seat 100 as depicted in FIG. 12, fluid loops 214 are disposed beneath and touching a surface or cover of the seat (e.g., embedded within ribbing or cushions). Lines indicating fluid loops 214 are depicted in FIG. 12 to illustrate exemplary locations for the fluid loops; however, fluid loops 214 are not normally visible on seat 100 because they are concealed beneath at least an outer layer of the seat.

Temperature 215 includes one or more temperature sensing devices, such as thermocouples or resistive temperature detectors (RTDs), that provide controller 120 with temperature information within aircraft feature 210. For example, if feature 210 is an aircraft seat, the one or more temperature sensing devices are disposed at an appropriate seat surface (e.g., a seat bottom, seatback, headrest, armrest, leg extension, or footrest).

Battery 116, which is described above in connection with FIGS. 1 and 2, is adapted to provide electrical power to controller 120 and valves 212 when aircraft electrical power is unavailable. When aircraft electrical power is available, a small amount of electrical current (e.g., a trickle charge) is provided to battery 116 via dry-break connector 205 for recharging the battery to maintain an adequate state-of-charge. Controller 120 includes power management instructions 142 for controlling switches to control the trickle charge to battery 116, and for providing battery status information and a low-charge warning indicator that may be displayed via interfaces 130, 139.

Controller 120 uses temperature-control instructions 145, which may include algorithms, lookup tables, and/or computational models, for determining appropriate commands to control temperature at one or more portions of aircraft feature 210. For example, instructions 145 may include control loops such as a proportional-integral-derivative (PID) control loop. An exemplary algorithm is a preconditioning algorithm for preheating or precooling an aircraft feature 210. The preconditioning algorithm may be activated by a flight crew member via a command from a crew interface 139, for example. One or more target temperatures and a completion time may be input by a user. Individual target temperatures may be selected for different aircraft features 210 and for different portions within each aircraft feature 210 (e.g., different zones within an aircraft seat). The zones are provided by having respective fluid loops 214 disposed in the aircraft feature 210. For example, in an aircraft seat, fluid loops 214 may be positioned in several locations (e.g., seatback, seat pan, armrest, headrest, footrest, etc.) and the different zones may be heated and cooled simultaneously.

The preconditioning algorithm evaluates relevant variables such as an available charge capacity of battery 116, an outside air temperature (OAT), a cockpit/cabin temperature, and temperatures of hot fluid source 250 and cold fluid source 260. Using a look-up table or formula, controller 120 determines commands to send to valves 212 and/or source pumps for providing hot/cold fluid flow, and determines the time needed for optimal just-in-time achievement of the preconditioning target temperature. The preconditioning algorithm avoids achieving the target temperature substantially before the target completion time to prevent excess energy loss.

In certain embodiments, controller 120 is located within aircraft feature 210; however, in some embodiments, controller 120 may be located elsewhere onboard the aircraft. Communication between controller 120 and components of the recipient feature 210 may be via a wired communication media (e.g., via dry-break connector 205), or alternatively, a wireless communication media may be used as described in connection with FIG. 1.

Controller 120 may be adapted as a local controller dedicated to an individual aircraft feature 210. In certain embodiments, a master controller 270, described below, may optionally be used to instruct one or more controllers 120 (e.g., to control valves 212 for receiving hot or cold fluid at one or more aircraft features 210 from system-wide fluid lines 253, 254).

Pumps (not shown) are used to transfer hot/cold fluids from sources 250, 260 via fluid lines 253, 254. Any type of pump may be used (e.g., piston, rotary gear, centrifugal, pneumatic, peristaltic, etc.). Typically, a relatively low flow rate is sufficient and pressure build up is avoided. Pumps are preferably placed in a location where passengers are unable to hear them. For aircraft seats, locating the pumps away from the seats reduces the electrical power requirements and weight of the seat, making the seat easier to maintain.

The fluid used for heat transfer is a non-corrosive inert fluid, such as propylene glycol mixed with water, which is maintained in a closed-loop system. Hot fluid source 250 includes a first liquid reservoir for storing a warm or hot fluid. Likewise, cold fluid source 260 includes a second liquid reservoir for storing a cool or cold fluid. The hot and cold fluid sources 250, 260 may optionally be located within the aircraft to take advantage heating and cooling through existing hot and cold sources. For example, surfaces exposed to engine bleed air 251 provide sources of heat (e.g., in the engine pylons), and exterior surfaces 261 of the fuselage provide sources for cooling during flight.

A dedicated heating device 252 and/or a dedicated cooling device 262 may optionally be employed to provide additional heating and cooling, or for use while the aircraft is on the ground. When grounded, the aircraft may have access to a ground power source, such as an auxiliary-power unit, for powering the dedicated heating and cooling devices. Also, the engine bleed air may not be available (e.g., when the engines are not running) and exterior surface cooling may not be available (e.g., during hot weather). The heating and cooling devices may include any device capable of adding or removing heat including a heat pump, TEGs, refrigeration, etc., in combination with one or more heat exchangers (e.g., a liquid to air heat-exchanger), which may include fans. One advantage of providing heating and cooling of hot fluid 250 and cold fluid 260, respectively, on the shipside is that any associated noise (e.g., from fans) may be located away from passengers and crewmembers onboard the aircraft.

User interface 130 provides a means for a user to provide temperature control input to controller 120. Similarly, crew interface 139 provides a means for a crew member (e.g., a pilot or attendant) to provide temperature control input to controller 120. User interface 130 may be conveniently located for a passenger, such as on a seat armrest (see e.g., FIGS. 3-5), on a side ledge, in a lavatory, or on a personal mobile device such as a smart phone. Crew interface 139 may be conveniently located for a crew member, such as in the cockpit or at an attendant's station. The interfaces 130, 139 may be any type of physical user interface including but not limited to a button, switch, dial, knob, joystick, or slider, or any type of computer-related input device including but not limited to a membrane switch, a graphical user interface (GUI), a touchscreen, keyboard, mouse or the like. The interfaces 130, 139 may be independent interfaces or integrated with other controls (e.g., seat controls to adjust seat positioning).

In certain embodiments, a wireless gateway 109 is optionally employed for enabling bi-directional wireless communication between controller 120 and each of the interfaces 130, 139. For example, a personal mobile device is adapted to communicate wirelessly with controller 120 via wireless gateway 109 by employing wireless transceivers (e.g., according to Wi-Fi or Bluetooth wireless standards).

Crew interface 139 may optionally provide an interface to master controller 270. Master controller 270 is for example a computer, cabin management system, cabin flight deck, or master management switch. Master controller 270 may be employed for communicating with a plurality of controllers 120. For example, a cabin management system operating on a computer enables a flight attendant to control temperature for a plurality of passenger seats 100 (e.g., prior to the passengers boarding the aircraft). Master controller 270 may store information about thermal management, such as a temperature preference of a particular seat for a particular passenger.

In operation, controller 120 receives requests from a user via interfaces 130, 139. Using temperature control instructions 145, controller 120 determines steps for meeting the requests and transmits commands. For example, if a passenger requests more heat on the lower back of his or her seat via user interface 130, controller 120 receives the signal and instructs the appropriate valves 212 such that the flow of heated fluid is directed from hot fluid source 250 to fluid loops 214 in a lower ribbing of the seatback. Since the fluid loops 214 provide a closed fluid system, as warmer fluid is pumped into the lower back ribbing, the existing fluid is pumped out of the fluid loop and back to hot fluid source 250 for reheating.

In another example, a crew member uses crew interface 139 to instruct a plurality of controllers 120 to preset (e.g., select a preset temperature) or precondition (e.g., preheat or precool) a respective plurality of aircraft seats 110 using a preconditioning algorithm of temperature-control instructions 145. Alternatively, master controller 270 provides commands to controller 120 for directing heating or cooling locally.

In certain embodiments, a hot temperature 255 of the hot fluid source 250 is measured and a cold temperature 265 of cold fluid source 260 is measured, and the respective temperature information is provided as part of data 245 to controller 120. Based on a requested temperature (e.g., a set point of 75° F.) by a user or a preconditioning algorithm, controller 120, using instructions 145, directs flow of hot or cold fluid to the appropriate fluid loops 214 via valves 212. The controller 120 may determine an estimated duration for achieving the requested temperature.

Advantages of aircraft heating/cooling control system 200 include improved energy efficiency, which reduces electrical load requirements on the aircraft's electrical systems that would otherwise be required to achieve the same heat transfer. Another advantage is that the aircraft seat does not have to carry the weight of pumps or a hot/cold fluid source. Additionally, system 200 is quiet since fans and pumps are located away from passengers and crew members. System 200 is modular, which enables changes to the distribution of hot/cold fluids.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A seat base, comprising:
   a plurality of linear actuators, each one of the plurality of linear actuators having a first end pivotally mounted to a base member and a second end, opposite the first end, pivotally mounted to a seat member;
   a controller adapted for controlling an extension length of each of the plurality of linear actuators for adjusting a position of the seat member; and
   wherein the controller is adapted to receive pilot inputs and to provide commands to the plurality of linear actuators for counteracting aircraft motion at the seat member based on the pilot inputs; and
   a battery housed within the seat base for providing electrical power to the plurality of linear actuators.

2. The seat base of claim 1, further comprising one or more accelerometers mounted to a portion of the seat member for providing acceleration data to the controller.

3. The seat base of claim 1, wherein each one of the plurality of linear actuators is pivotally mounted to the base member via a first pivoting clevis at the first end and to the seat member via a second pivoting clevis at the second end.

4. The seat base of claim 1, wherein the plurality of linear actuators include three pairs of linear actuators arranged to articulate the seat member in six degrees-of-freedom (DOE).

5. The seat base of claim 1, wherein the controller is adapted to determine a vibration profile of the seat member based on the acceleration data and to determine control signals for transmitting to each of the plurality of linear actuators for damping vibration of the seat member.

6. The seat base of claim 1, further comprising a user interface for enabling a user to provide inputs to the controller for simultaneously controlling the plurality of linear actuators to translate the seat member vertically, horizontally and longitudinally, to tilt the seat member about the pitch and roll axes of the aircraft, and to twist the seat member about the yaw axis of the aircraft.

7. The seat base of claim 1, further comprising one or more accelerometers located at the center-of-gravity of the aircraft such that accelerometer data from the center-of-gravity of the aircraft is received by the controller for determining vibration and motion information of the aircraft.

8. The seat base of claim 1, further comprising:
   a first accelerometer mounted to the base member; and
   a second accelerometer mounted to the seat member,
   wherein s the controller minimizes vibration of the seat member via a closed control loop based on a signal difference between the first accelerometer and the second accelerometer.

9. A seat base for an aircraft, comprising:
   a plurality of linear actuators each pivotally mounted by a first end to a base member and by a second end, opposite the first end, to a seat member to enable movement of the seat member;
   a controller for controlling extension of the plurality of linear actuators in a coordinated manner for controlling movement of the seat member, wherein the controller is adapted to receive pilot inputs and to provide commands to the plurality of linear actuators for counteracting aircraft motion at the seat member based on the pilot inputs; and
   the controller is programmed to automatically move the seat base to a predetermined position based on a phase of flight of the aircraft.

10. The seat base of claim 9, comprising a user input device communicatively coupled with the controller, wherein the controller is adapted to receive inputs from the user input device for adjusting position of the aircraft seat with six degrees-of-freedom based on the inputs received.

11. The seat base of claim 9, comprising a pilot control wheel wherein the controller is adapted to receive pilot inputs from the pilot control wheel for determining expected motions of the aircraft and to provide commands to the plurality of linear actuators for counteracting aircraft motion at the seat member.

12. The seat base of claim 9, further comprising one or more accelerometers mounted to the seat member such that the controller receives data from the plurality of accelerometers and determines a vibration profile of the seat member for damping vibration of the seat member.

13. The seat base of claim 9, comprising a battery for providing electrical power to the plurality of linear actuators such that movement of the seat base to the predetermined position based on the phase of flight of the aircraft is powered by the battery without aircraft electrical power.

14. The seat base of claim 9, comprising an autopilot servo wherein the controller is adapted to receive command inputs from the autopilot servo for determining expected motions of the aircraft and to provide commands to the plurality of linear actuators for counteracting aircraft motion at the seat member based on the command inputs.

15. A seat base for an aircraft, comprising:
- a plurality of linear actuators, wherein each of the plurality of linear actuators is pivotally mounted by a first end to a base member and by a second end, opposite the first end, to a seat member;
- a seat controller adapted for controlling an extension length of each of the plurality of linear actuators in a coordinated manner for adjusting a position of the seat member with respect to the base member, wherein the seat controller is adapted to receive pilot inputs and to provide commands to the plurality of linear actuators for counteracting aircraft motion at the seat member based on the pilot inputs; and
- a crew interface communicatively coupled with the seat controller, wherein the crew interface is configured to receive a command for adjusting a position of a seat into a predetermined position via the plurality of linear actuators.

16. The seat base of claim 15, wherein the crew interface is configured to receive a command for adjusting the position of the seat based on an occupancy of the seat.

17. The seat base of claim 15, wherein the crew interface is configured to receive a command for adjusting the position a plurality of seats, wherein the plurality of seats each comprise a plurality of linear actuators and a seat controller, such that the position of the plurality of seats may be adjusted simultaneously based on the command.

\* \* \* \* \*